(12) United States Patent
Liu et al.

(10) Patent No.: US 12,462,078 B1
(45) Date of Patent: Nov. 4, 2025

(54) MODELING SIMULATION AND MULTI-FIELD COUPLING ANALYSIS METHOD AND SYSTEM FOR ELECTROMAGNETIC RAILGUN SYSTEM

(71) Applicant: SHANDONG UNIVERSITY, Jinan (CN)

(72) Inventors: Hongshun Liu, Jinan (CN); Luyao Liu, Jinan (CN); Jingtong Feng, Jinan (CN); Pengfei Lu, Jinan (CN); Li Zhang, Jinan (CN); Xiaolong Wang, Jinan (CN); Tong Zhao, Jinan (CN); Fuqiang Ren, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 19/192,449

(22) Filed: Apr. 29, 2025

(30) Foreign Application Priority Data

Apr. 29, 2024 (CN) .......................... 202410530541.9

(51) Int. Cl.
*G06F 30/20* (2020.01)
*F41B 6/00* (2006.01)
(Continued)

(52) U.S. Cl.
CPC .............. *G06F 30/20* (2020.01); *F41B 6/006* (2013.01); *G06F 17/13* (2013.01); *G06F 2111/10* (2020.01); *G06F 2119/14* (2020.01)

(58) Field of Classification Search
CPC ...... G06F 30/20; G06F 17/13; G06F 2111/10; G06F 2119/14; F41B 6/006
See application file for complete search history.

(56) References Cited

FOREIGN PATENT DOCUMENTS

| CN | 104182589 A | * | 12/2014 | ............. G06F 17/50 |
| CN | 105183993 B | * | 4/2018 | ............. G06F 17/50 |

(Continued)

OTHER PUBLICATIONS

Lin Q. Multifield and multiscale modeling of armature wear in electromagnetic railgun. IEEE Transactions on Plasma Science. May 25, 2022;50(6): 1971-6. (Year: 2022).*

(Continued)

*Primary Examiner* — Chuen-Meei Gan
(74) *Attorney, Agent, or Firm* — IPro, PLLC; Na Xu

(57) ABSTRACT

The present invention provides a modeling simulation and multi-field coupling analysis method for electromagnetic railgun system, comprising: for electromagnetic railgun, respectively building mathematical model of pulse shaping unit, mathematical model of armature impedance, mathematical model of rail and dynamic model of armature of electromagnetic railgun system; by using modularization method, forming simulation model of the electromagnetic railgun based on each built model; carrying out coupling simulation on current density and magnetic induction intensity distribution of the simulation model of the electromagnetic railgun, and analyzing coupling action and distribution characteristics of electromagnetic field in launching process of the electromagnetic railgun and influence of the electromagnetic field on temperature field distribution; based on the analysis result, determining positions where severe ablation appeared and electric contact arcing easily generated on the electromagnetic railgun, and carrying out preventive and maintenance measures.

5 Claims, 20 Drawing Sheets

(51) Int. Cl.
   *G06F 17/13*    (2006.01)
   *G06F 111/10*   (2020.01)
   *G06F 119/14*   (2020.01)

(56) References Cited

FOREIGN PATENT DOCUMENTS

| | | |
|---|---|---|
| CN | 110793388 A | 2/2020 |
| CN | 116306071 A | 6/2023 |
| CN | 117709292 A | 3/2024 |

OTHER PUBLICATIONS

Ma S, Lu S, Ma H, Wang H, Nong A, Ma D, Yan C, Liu C. Investigation on the spatial-temporal distribution of electromagnetic gun rail temperature in single and continuous launch modes. IEEE Transactions on Plasma Science. Jun. 28, 2022;50(7):2270-8. (Year: 2022).*

Liu Y, Guo W, Zhang T, Zhang H, Fan W, Su Z. Structural design of armature with interference at both ends and analysis of its launching performance. IEEE Transactions on Plasma Science. Jul. 31, 2020;48(8):2922-31. (Year: 2020).*

Li Xiaojiang; Wan Min; Wang Zhiheng; Yang Xiye; "Numerical Simulation of Temperature Field and Thermal Stress in Electromagnetic Railgun"; Fire Control and Command Control, No. 2; Feb. 15, 2017.

Li Xiangping; Lu Junyong; Li Yu; Wu Xiaokang; "3-D numerical analysis of distribution characteristics of electromagnetic launcher projectile in-bore magnetic field"; Electric Machines and Control, No. 8; Jul. 2, 2018.

* cited by examiner

MODELING SIMULATION AND MULTI-FIELD COUPLING ANALYSIS METHOD AND SYSTEM FOR ELECTROMAGNETIC RAILGUN SYSTEM

CROSS-REFERENCE TO RELATED APPLICATIONS

The present invention claims priority benefits to Chinese Patent Application number 202410530541.9, entitled "A Modeling Simulation and Multi-field Coupling Analysis Method and System for an Electromagnetic Railgun System", filed on Apr. 29, 2024, with China National Intellectual Property Administration, the entire contents of which are incorporated herein by reference and constitute a part of the present invention for all purposes.

TECHNICAL FIELD

The present invention belongs to the technical field of simulation, and particularly relates to a modeling simulation and multi-field coupling analysis method and system for an electromagnetic railgun system.

BACKGROUND

The statements in this section merely provide background information related to the present invention and do not necessarily constitute prior art.

Electromagnetic railgun is a weapon system that uses electromagnetic field to accelerate and launch objects. The electromagnetic railgun may have a high launch speed, which makes this weapon have strong penetration and destructive power, and may have a long range, which can hit targets at a long distance: in addition, the electromagnetic railgun does not need conventional shells, it uses smaller projectiles, and does not produce explosions and chemical pollution during the launching process, which is more environmentally friendly and safe. Therefore, the research and development of the electromagnetic railgun is very necessary and important.

A theoretical basis of electromagnetic launching technology covers many subjects such as electromagnetism, mechanics, thermodynamics, etc. In order to understand the launching process of the electromagnetic railgun system more accurately, it must be studied deeply. However, the electromagnetic railgun system has strict requirements on power source, structure and material, and the technology is complex and the experimental cost is high. An operation of the electromagnetic railgun involves mechanical, electromagnetic, thermal and other physical processes, and these physical processes are coupled with each other and very complex, making it difficult to comprehensively and accurately grasp the entire launching process.

Moreover, the technology of the electromagnetic launching experiment is complex, the experiment cost is high, the power source, structure, material and other aspects of the requirements are more stringent, and it is difficult to grasp the whole process of launch. Compared with physical experiment, modeling-simulation technology of the electromagnetic railgun can reduce expensive experiment cost and later maintenance cost, and can also clearly obtain the effect of each factor on its output performance. In this way, rapid, multiple and economical simulations in virtual environments can also speed up research progress.

However, according to the inventor's understanding, the current methods for modeling of current electromagnetic railgun have the following shortcomings.

The first current method is a distributed parameter modeling method, building a distributed parameter model describing the distribution state of physical quantities in space and usually being used to analyze the stress field and electric field of each component of the electromagnetic railgun. The form of the model is partial differential equation. The deficiency is that it mainly considers the influence of some factors and physical quantities on the physical characteristics of the railgun, and lacks simulation analysis of the overall performance of the electromagnetic railgun system.

The second current method is lumped parameter modeling method, building a lumped parameter model describing a "lumped" representation of the physical phenomena acting on various components and being mainly described by differential equations. This method requires high domain knowledge of modelers. By using this method, the modelers need to be clear about the working principle of the whole system, clear about the functions and mutual influence of each component, and use the corresponding theoretical knowledge to build the model of the system. In this method, modeling efficiency is low; and modeling repeatability is high, and model inheritance is poor. This means, when only a certain component in the system changes, the system model usually needs to be rebuilt, and the model inheritance of the unchanged component is very poor. And, the model portability is poor. That is to say: although many real systems have great differences in performance, their composition may be similar, that is, some parts of the system are the same, and their models are similar to these parts: however, it is difficult to transplant the models of these parts from the system model.

Modular modeling method is to decompose a complex system into several relatively independent modules according to certain principles, wherein these modules can be systems with specific functions or components in the system, to build models of each module respectively and define interfaces between modules, and connect modules by certain methods, thus completing the building of the whole system model. The basic parts of the electromagnetic railgun are mainly of four parts-power source, rails, armature and projectile, and various types of each part are connected together in the same or different ways to form different types of the electromagnetic railgun. By using the modular modeling method, a complex system may be divided into several small modules: however, the models of each small module are built by modelers in different fields, which need to have certain professionalism and credibility: moreover, not all researches on electromagnetic railgun are suitable for the modular modeling method, which easily leads to modeling complexity.

At the same time, in the performance optimization of the electromagnetic railgun, the existing technology is fragmented in optimization objectives, optimization parameters and constraint conditions, and these three are not well combined to build the overall optimization model of the electromagnetic railgun. The using of the optimization algorithm is not precise enough, and the necessary constraint conditions, such as timing range, muzzle voltage, etc., are not fully considered.

SUMMARY

In order to solve above problems, the present invention provides a modeling simulation and multi-field coupling analysis method and system for an electromagnetic railgun system, carrying out the model establishment and simulation analysis aiming at the research and analysis of the output characteristic of the electromagnetic railgun, and carrying out a three-dimensional (3D) simulation on an electromagnetic distribution in a launching process of the electromagnetic railgun, so that a launching principle and influence factors of the electromagnetic railgun under multi-field coupling are more deeply understood.

According to some embodiments, the present invention adopts the following technical solutions.

A modeling simulation and multi-field coupling analysis method for an electromagnetic railgun system, comprising the following steps:

building, respectively, a mathematical model of pulse shaping unit, a mathematical model of armature impedance, a mathematical model of rail and a dynamic model of armature of an electromagnetic railgun system for an electromagnetic railgun:

forming, by using a modularization method, a simulation model of the electromagnetic railgun based on each of the built models:

carrying out a coupling simulation on a current density and a magnetic induction intensity distribution of the simulation model of the electromagnetic railgun, and analyzing a coupling action and distribution characteristics of an electromagnetic field in a launching process of the electromagnetic railgun and an influence of the electromagnetic field on a temperature field distribution; and determining, based on the analysis result, positions where a severe ablation appeared and/or where an electric contact arcing to be generated on the electromagnetic railgun; and performing structure optimization, material surface modification, component maintenance or replacement, and/or launch parameter adjustment on the determined positions on the electromagnetic railgun, to reduce the ablation degree and the ablation risk, so as to maintain a working performance of the electromagnetic railgun.

As an optional implementation mode, a specific process of building the mathematical model of pulse shaping unit of the electromagnetic railgun system comprises: building a model of topological structure according to a topological structure of the pulse shaping unit: dividing a discharge process into a discharge stage and a freewheeling stage according to whether a freewheeling diode is turned on or not when the model of topological structure is provided with a linear load; and, building circuit equations of the two stages respectively to form the mathematical model of pulse shaping unit.

As an optional implementation mode, a specific process of building the mathematical model of armature impedance of the electromagnetic railgun system comprises: expressing a resistance caused by a skin effect of current on an armature, dividing a contact resistance caused by a skin effect of velocity into two parts, comprising a contact resistance under skin effect of velocity on rails and a contact resistance under skin effect of velocity on the armature, and respectively expressing each part to form the mathematical model of armature impedance.

As an optional implementation mode, a specific process of building the mathematical model of rail of the electromagnetic railgun system comprises: constructing an expression of resistance of the rails, calculating a resistance gradient of the rails, expressing a skin depth of the rails in combination with the calculated resistance gradient, and constructing a loop current expression of the rails based on a circuit structure of the rails.

As an optional implementation mode, a specific process of building the dynamic model of armature of the electromagnetic railgun system comprises: calculating an electromagnetic force on the armature based on magnetic field energy of a launching system, expressing a friction force between the rails and the armature based on a sliding friction coefficient:

expressing a dynamic normal pressure on the armature under assumptions that a force acting on the armature is linearly distributed and that a transformation from an axial stress to a radial stress is described by a linear function;

expressing an air resistance under assumptions that a density of an air being uncompressed in the rails before electromagnetic launch is of a standard atmospheric state, that a time taken for the air to be compressed is ignored when a shock wave is generated immediately after an armature acceleration, that the density and pressure of the air being compressed are uniform and the specific heat rate is constant, and that the speed of the air being compressed in the rails is consistent with that of the armature; and expressing, in a form of differential equation, a motion equation of the armature based on the friction force between the rails and the armature, the dynamic normal pressure on the armature and the air resistance.

As an optional implementation mode, a specific process of carrying out the coupling simulation on the current density and the magnetic induction intensity distribution of the simulation model of the electromagnetic railgun comprises: simulating a distribution of the current density of the simulation model by using a transient field, recording a flow direction of a current and change characteristics of the distribution of the current density along with time in a launching process of the armature when a pulse current is input, determining the distribution of the current density of the armature at different times in the launching process, selecting maximum current density values at a groove of the armature at a plurality of times, drawing a trend diagram along with time, and recording a variation rule of the current density along with a waveform of the input pulse current; and simulating the magnetic induction intensity of the simulation model based on distribution results of the current density under the transient field, determining areas with concentrated distribution of the magnetic induction intensity of an electromagnetic launching device in the launching process, selecting magnetic induction intensity values at the groove of the armature and contact points of armature-rails at several times, drawing the selected magnetic induction intensity values as a trend graph varying with time, and recording a variation law of the magnetic induction intensity with the waveform of the input pulse current.

As an optional implementation mode, a specific process of analyzing the coupling action and the distribution characteristics of the electromagnetic field in the launching process of the electromagnetic railgun, directly affecting a distribution of the temperature field, comprises: dividing a heat sources in a launching process of the electromagnetic railgun into three parts, which are (i) a Joule heat generated by self-resistance between the armature and the rails, (ii) a heat generated by a contact resistance on a contact surface between the armature and the rails, and (iii) a heat generated by the friction between the armature and the rails, constructing, respectively, calculation expressions of the three parts, simulating a temperature field of the electromagnetic launching device under electromagnetic coupling by considering a superposition action of the three parts of the heat in the launching process, and determining time-varying characteristics of temperature of the armature, changes of temperature under different peak values of the input pulse current, and changes of temperature under different waveforms of the input pulse current.

As an optional implementation mode, the positions where the electrical contact arcing to be generated on the electromagnetic railgun may comprises: a contact position between the armature and the rails where the current density may be concentrated to cause a local Joule heat and a heat accumulation:
- an area with high magnetic induction intensity being concentrated in the groove of the armature and around the contact points between the rails and a tail of the armature, as well as inner surfaces of two the rails; and
- an area with high temperature distribution intensity being concentrated in the groove of the armature and around the contact points between the rails and the tail of the armature.

A modeling simulation and multi-field coupling analysis system for an electromagnetic railgun system, comprising:
- a model building module, being configured to respectively build a mathematical model of pulse shaping unit, a mathematical model of armature impedance, a mathematical model of rail, and a dynamic model of armature of an electromagnetic railgun system for an electromagnetic railgun:
- a modularization module, being configured to form a simulation model of the electromagnetic railgun based on each of the built model by using a modularization method; and
- a coupling-simulation-analysis module, being configured to perform a coupling simulation on a current density and a magnetic induction intensity distribution of the simulation model of the electromagnetic railgun, analyze a coupling action and distribution characteristics of an electromagnetic field in a launching process of the electromagnetic railgun and an influence of the electromagnetic field on a temperature field distribution, and determine and output positions where severe ablations appeared and/or where electric contact arcing to be generated on the electromagnetic railgun based on analysis results:
- wherein, for the determined positions on the electromagnetic railgun with serious ablation and easy occurrence of electric contact arcing, performing operations such as structure optimization on armature-rails, surface modification of materials, optimization of launching parameters, regular detection and maintenance, to maintain a working performance of the electromagnetic railgun.

An electronic device, comprising a memory and a processor, and computer-readable instructions stored on the memory and running on the processor, when the computer-readable instructions are executed by the processor, causing the processor to perform the steps of the method described above.

Compared with the prior art, the present invention has the beneficial effects that:

According to the present invention, it is providing the discharge process analysis and mathematical model of the pulse shaping unit, building the relevant circuit model and mathematical model, and describing the armature motion and rail characteristics: according to the present invention, it is describing the motion characteristics of the armature in a mathematical mode, building a dynamic model for simulation and analysis, simulating a impulsing power source module, exploring the influence rules of initial charging voltage and energy storage capacitance values on waveforms, maximum values, rising speeds and peak time of the pulse current, carrying out the whole simulation of the electromagnetic railgun, and obtaining simulation curves of current in the rails, armature speed, displacement and the like, which can ensure the accuracy of later analysis.

According to the present invention, it is deeply exploring the corresponding relationship between electromagnetic field distribution, current flow and temperature field distribution, defining the specific position of the ablation on armature-rails of the electromagnetic railgun, and finding out that the temperature is most concentrated at the groove of the armature and around the contact point between the rails and the tail of the armature by simulation: wherein, the high temperature in these areas may lead to ablation, wear and even electrical contact arcing of the material, and then corresponding measures can be taken to prevent and mitigate these problems. Simultaneously, according to the maximum value, the waveform and the peak time of the pulse current, further exploring the temperature rise rate and heat accumulation law of the heat concentration parts, which lays a research foundation for reducing contact ablation in electromagnetic launch and improving the reliability and safety of electromagnetic launching devices.

According to the present invention, it is providing a modeling foundation for optimization research of the electromagnetic railgun, and having long-term significance for research on an ablation mechanism of the electric contact arcing of the electromagnetic railgun system under the action of electromagnetic-thermal-force multi-field coupling, and improvement of the repeated utilization rate and the service life of the electromagnetic launching device.

In order to make the above objects, features and advantages of the present invention more apparent, preferred examples are described in detail below with reference to the accompanying drawings.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

DETAILED DESCRIPTION

The present invention will now be further described below with reference to the accompanying drawings and examples.

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is also intended to include the plural form unless the context clearly dictates otherwise. In addition, it should further be understood that, terms "comprise" and/or "comprising" used in this specification indicate that there are features, steps, operations, devices, components, and/or combinations thereof.

The examples and the features of the examples in the present invention may be combined with each other without conflict.

EXAMPLE 1

A modeling simulation and multi-field coupling analysis method for an electromagnetic railgun system, comprising the following steps:

building, respectively, a mathematical model of pulse shaping unit, a mathematical model of armature impedance, a mathematical model of rail and a dynamic model of armature of an electromagnetic railgun system:

forming, by using a modularization method, a simulation model of the electromagnetic railgun based on each of the built models; and carrying out a coupling simulation on a current density and a magnetic induction intensity distribution of the simulation model of the electromagnetic railgun, analyzing a coupling action and distribution characteristics of an electromagnetic field in a launching process of the electromagnetic railgun and an influence of the electromagnetic field on a temperature field distribution, and determining a position where an electric contact arcing will be generated on the electromagnetic railgun based on the analysis result.

The specific process of each step is described below:

First of all, an electromagnetic rail launching system can be divided into three main parts: one is a pulse shaping unit, one is an impedance component of rail/armature and another one is armature dynamics component. It lays a foundation for software modeling, performance analysis and research of efficiency improvement of the electromagnetic railgun through analyzing an interaction between these three parts, and building a mathematical model.

Working Principle of Electromagnetic Railgun

Figure 1:
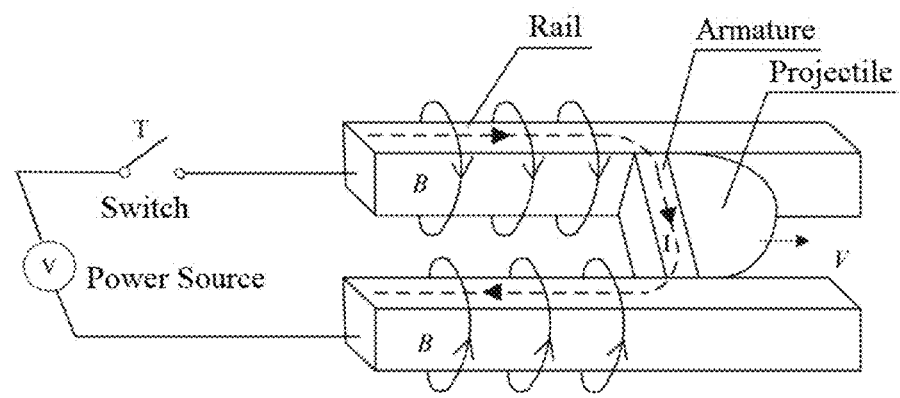
FIG. 1 is an equivalent circuit diagram of an electromagnetic rail launching device according to an example of the present invention.

The electromagnetic railgun is an important form of electromagnetic launcher, which belongs to linear motor in essence. In general, an electromagnetic rail launcher consists of a high-power impulsing power source, a pair of parallel metal rails, an armature and a projectile. A charged capacitor provides the energy needed for the electromagnetic railgun during the launching process. The capacitor, together with a wave modulation inductor and switch, forms a pulse power net (PFN). Usually, the PFN is arranged at a tail of the railgun and adopts a centralized power source mode. The rails are made of a metal that is resistant to wear and ablation and have good electrical conductivity, capable of conducting current and guiding armature and projectile motion. The armature is provided in the middle of the two parallel rails, which plays the role of conducting current and transmitting Lorentz force. The projectile is placed in front of the armature and accelerates forward along the rails with the armature under the impetus of the Lorentz force. The working principle is shown in FIG. 1.

The working principle specifically is: controlling a main switch in a pulse discharge unit (PFU) to conduct, quickly loading the energy in the capacitor on the rails and the armature, generating a strong magnetic field in a closed loop by a generated pulse large current in the rails and the armature, then generating a strong Lorentz force under interaction action between the magnetic field and the current flow through the armature, to push the armature and the projectile forward at high speed, finally shooting the projectile out the bore of the railgun at a very high speed.

Building of Mathematical Model of Pulse Shaping Unit (1) Analysis of a Topological Structure of the Pulse Shaping Unit As the key technology of electromagnetic launch, a high-power impulsing power source directly affects the performance of electromagnetic rail launching system. As a lethal kinetic energy weapon, the electromagnetic launchers have extremely high requirements for power density and reliability of power supplies. A core of the high-power impulsing power source is an energy storage component, of which common types comprise: capacitors, inductors, and motors. Wherein, capacitor energy storage technology is the most mature and widely used, which is the mainstream power source scheme for electromagnetic launch. The topology of the PFU, according to the position of a freewheeling diode D, can be divided into two types: one is that the freewheeling diode D is located in front of the main switch; and the other is that the freewheeling diode D is located behind the main switch. These two topologies of the PFU are shown in FIG. 2.

Figure 2A:
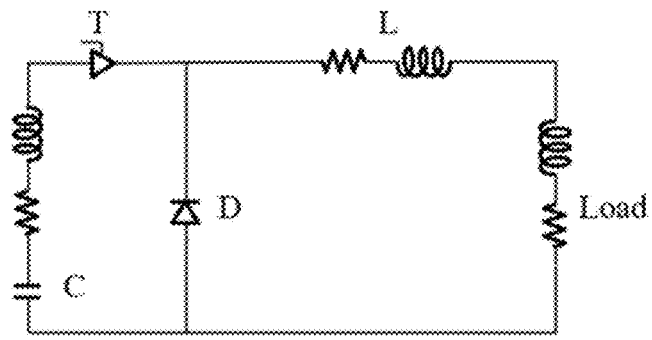
FIG. 2A is a circuit topology structure diagram of a of a pulse power unit (PFU) according to an example of the present invention.

In the circuit topology shown in FIG. 2A, a thyristor T is located before a freewheeling loop. Before the capacitor C discharges, the thyristor T isolates the diode D located in a freewheeling branch, reducing a withstand voltage requirement for the diode D: after the thyristor T is turned on, the capacitor C discharges to a wave modulation inductor L and the load: when the discharge current reaches the peak value, the thyristor T is turned off, and the current continues to flow through the diode loop. Therefore, only the current in the rising phase flows through the thyristor T, which reduces the requirement on the current passing ability of the thyristor T. However, this discharge mode has obvious disadvantages when triggering discharge of multiple modules in a time-sharing manner.

Because the rails themselves in the launching device are an inductive load, during the stage of decreasing discharge current, if the induced electromotive force of the equivalent inductance component connected to the rails in the launching device is greater than a terminal voltage of the equivalent resistance component thereof, the freewheeling diode D in the other non-working modules will be conducted in advance, and if the trigger signal of the module arrives at this time, the capacitor will be short-circuited and discharged by the thyristor T and the diode D, the resulting extremely high current rise rate and overvoltage may cause damage to the thyristor T and the diode D.

Figure 2B:
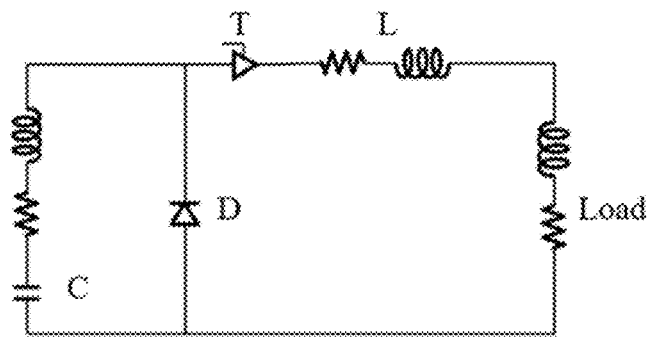
FIG. 2B is another circuit topology structure diagram of the PFU according to an example of the present invention.

In the circuit topology shown in FIG. 2B, the thyristor T is located after the freewheeling branch. The advantage of this topology is that the thyristor T isolates the inductive voltage that may occur on the rails, and the diode D does not turn on prematurely due to induced overvoltage, thus avoiding the possibility of damage to the switching device in FIG. 2A. The disadvantage is that the thyristor T and the diode D will bear all the voltage of the capacitor, and the capacitor C will also generate leakage current on the freewheeling branch: at the same time, the thyristor T participates in the whole discharge cycle, and more heat will be accumulated under full current operation, so the thyristor T is required to have higher heat conduction capability in this case.

(2) Derivation of Analytical Formula of the Pulse Shaping Unit

When the topological structure of the pulse shaping unit is under a linear load, according to whether the freewheeling diode D is conductive or not, the discharge process can be divided into two stages: the first stage is capacitor-inductor-resistor discharge stage and the second stage is resistance-inductor freewheeling stage.

The discharge phase, i.e., the rising phase of the pulse current, the diode withstands reverse voltage and cut-off, and a circuit equation is:

$$L_1 C \frac{d^2 i}{dt^2} + R_1 C \frac{di}{dt} + U = 0 \tag{1}$$

Wherein, $L_1$ is the total inductance of the loop: $R_1$ is the total resistance of the loop: C is the capacitance of the capacitor; and U is the pre-charge voltage of the capacitor. Due to the small resistance $R_1$ in the loop, the discharge current i flowing through the load is in the form of underdamped oscillations, which can be described as:

$$i(t) = \frac{U}{\omega L_1} e^{-\alpha t} \sin(\omega t) \tag{2}$$

Wherein, ω is the frequency of damping oscillation; and a is the attenuation coefficient. From the equation of pulse power discharge, a maximum current value $i_{max}$ at this time can be obtained as:

$$i_{max} = U \sqrt{\frac{C}{L_1}} e^{\frac{-\alpha}{\sqrt{\omega_0^2 - \alpha^2}} \arctan\left(\frac{\sqrt{\omega_0^2 - \alpha^2}}{\alpha}\right)} \tag{3}$$

$$\omega_0^2 = 1/L_1 C \quad (4)$$

$$\alpha = R_1/2L_1 \quad (5)$$

The freewheeling phase, i.e., the falling phase of the pulse current, can be described in an equation as:

$$L_2 \frac{di}{dt} + iR_2 = 0 \quad (6)$$

Wherein, $L_2$ is the total inductance of the freewheeling circuit: $R_2$ is the total resistance of the freewheeling circuit. Then the current can be described as follows:

$$i(t) = i_{max} e^{-\frac{R_2}{L_2}t} \quad (7)$$

Building of Mathematical Model of Armature Impedance

Because of the skin effect of current, the current density is distributed unevenly on the aluminum-made metal armature, which mainly exists in a thin layer on the surface of the armature. The existence of the skin effect of current will cause additional resistance on the rails. The additional resistance $R_a$ (t, I) resulting from the skin effect of current on the armature can be expressed as a function of current value I and current duration t, as:

$$R_a = \frac{s}{h_a} \sqrt{\frac{\pi \mu_a \rho_a}{2t}} \quad (8)$$

Wherein, $h_a$ is the height of the armature; s represents the spacing between the parallel rails, numerically equal to the width of the armature: $\mu_a$ is the permeability of the aluminum-made armature; and $P_a$ is the instantaneous resistivity of the armature. When a strong pulse current is applied, Joule heating effect exists on the metal armature, and its resistivity $P_a$ increases with temperature, which is an instantaneous resistivity. The effect of temperature on armature resistivity can be equivalently characterized by instantaneous resistivity $P_a$ proportional to current, which is:

$$\rho_a = \rho_{a0} + \beta_a \frac{I}{h_a} \quad (9)$$

Wherein, $P_{a0}$ is the initial resistivity of the aluminum-made armature; the instantaneous resistivity coefficient $\beta_a$ is a constant dependent on the armature material.

When the armature moves on the rails, the armature and the rails are not in close contact with zero resistance, that is, there is a contact layer between the armature and the rails, which can be characterized as the contact resistance between the armature and the rails.

Figure 3A:
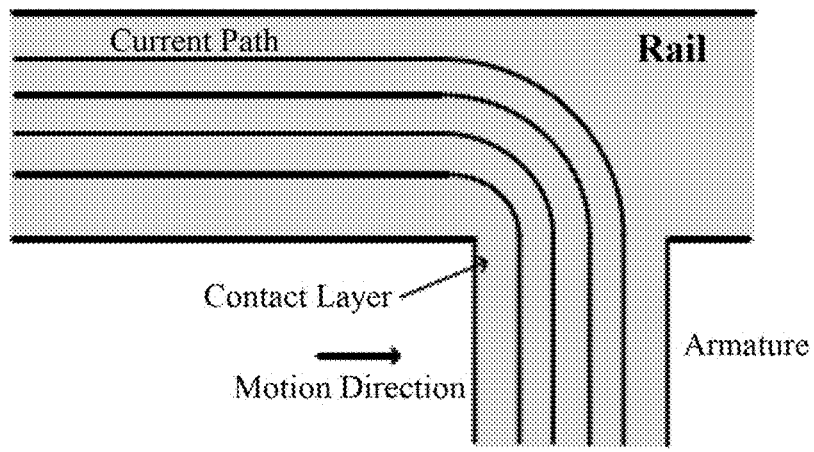
FIG. 3A is a distribution diagram of a current in rails, an armature and a contact layer when the current is non-high frequency pulse and the armature moves at low speed according to an example of the present invention.
Figure 3B:
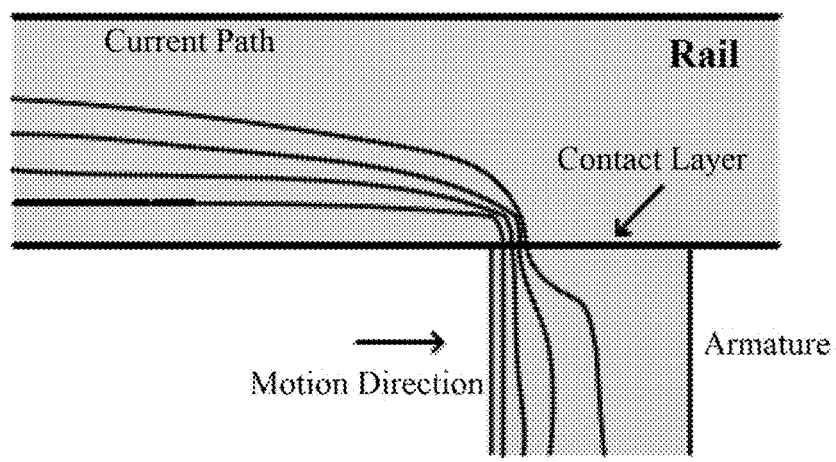
FIG. 3B is a distribution diagram of a current in the rails, the armature and the contact layer when the current is high-frequency pulse and the armature moves at high speed according to an example of the present invention.

As shown in FIG. 3, when the current is non-high frequency pulse and the armature moves at low speed, the current will be evenly distributed in the rails, the armature and the contact layer. The current density can be considered equal everywhere, and the equivalent resistance of each part is a steady state value, which remains basically unchanged. When the current is high-frequency pulse and the armature moves at high speed, the flow path and density distribution of the current in the rails, the armature and the contact layer will change obviously. Because the resistance on the contact layer is much greater than that of the armature and the rails, the contact layer is less affected by magnetic diffusion. The current creates a distinct contraction in the contact layer and then disperses in the armature. Therefore, the skin effect of velocity on the contact layer is the main factor limiting the kinetic energy and efficiency of the distributed energy storage-type electromagnetic railgun.

The contact resistance $R_v$ under the skin effect of velocity can be divided into two parts: a contact resistance under skin effect of velocity on the rails $R_{vr}$ and contact resistance under skin effect of velocity on the armature $R_{va}$, which are:

$$R_v = 2\rho_f v^{1.5}/A_c$$

$$R_{vr} = K_v R_v$$

$$R_{va} = (1-k_v) R_v \quad (10)$$

Wherein, $k_v$ is the proportionality constant of the contact resistance under skin effect of velocity: $\rho_f$ is the resistivity of the contact layer, unit is $\Omega \cdot m^2$, which is generally between 10-11 and 10-12: Ac is the contact area of the armature with the rails, unit is $m^2$; and v is the armature velocity, unit is m/s.

Building of Mathematical Model of Rail

When the armature drives the projectile to move forward continuously, the length of the rails connected to the loop increases continuously, and the resistance of rails also increases continuously. Therefore, the resistance of the rails can be expressed as:

$$R_r = R_0 + R'_r x \quad (11)$$

Wherein, $R_r$ is the instantaneous resistance of the rails, unit is $\Omega$; $R'_r$ is the resistance gradient of the rails (i.e., resistance value per unit length of rails), and unit is $\Omega/m$: $R_0$ is the initial resistance of the rails, unit is $\Omega$: x is the armature displacement (length of the rails connected to the launch loop), unit is m.

From the definition of resistance, it can obtain the resistance gradient of the rails, as:

$$R'_r = 2\frac{\rho_r}{s} \quad (12)$$

Wherein, pr is the instantaneous resistivity of the resistance of the rails, unit is $\Omega \cdot m^2$; s is the equivalent cross-sectional area of the resistance of the rails, unit is $m^2$.

Due to the short duration of the entire launching process, the short acceleration time of the armature, and the very short duration of the current in the rail-loop, there is the skin effect of current in the rails, and the skin depth of the rails is:

$$\delta(t) = \sqrt{\frac{\pi \rho_r t}{\mu_0}} \quad (13)$$

Wherein, $\delta(t)$ is the skin depth of the rails: $\mu_0$ is the permeability of the material of the rails: t is the duration of the current flowing into the rails.

In order to simplify the calculation of the cross-sectional area of the resistance of the rails, at the time t, the depth of current penetration into the rails is expressed as the average skin depth, which is:

$$\overline{\delta}(t) = (1/2)\sqrt{\frac{\pi \rho_r t}{\mu_0}} \quad (14)$$

Therefore, the cross-sectional area of the resistance of the rails is shown in Equation (15) below: wherein, h is the height of the rails:

$$s = (1/2)\sqrt{\frac{\pi \rho_r t}{\mu_0}} h \quad (15)$$

When the system is running, a large amount of Joule heat is generated in the rails, and the armature also radiates a large amount of heat to the rails, so the temperature of the rails is constantly changing, and the resistivity is related to the temperature of the rails, so the resistivity of metal of the rails is also constantly changing. Since the heat absorbed by the rails is converted from electrical energy, the resistivity of metal of the rails is related to the current passing into the rails, so the resistivity of metal of the rails can be expressed as:

$$\rho_r = \rho_{r0} + \beta(i/h) \quad (16)$$

Wherein, $\rho_{r0}$ is the initial resistivity of metal of the rails: $\beta$ is a constant; and i is the current in the rails.

Substituting Equations (15) and (16) into Equation (12), obtaining:

$$R'_r = 2 \frac{\rho_{r0} + \beta(i/h)}{(1/2)\sqrt{\frac{\pi \rho_r t}{\mu_0}} h} \quad (17)$$

When the armature drives the projectile to move forward continuously, the length of the rails connected to the loop increases continuously, and the rails also store a certain amount of magnetic field energy, so the rails are equivalent to a variable inductance coil, so the rail inductance can be expressed as:

$$L_r = L_0 + L'_r x \quad (18)$$

Wherein, $L'_r$ is the inductance gradient of the launcher (inductance per unit length), unit is H/m; and, $L_0$ is the initial inductance in the circuit, unit is H.

For a practical railgun, the resistance and inductance gradient of the rails is not very sensitive to changes in the shape and size of the rails, so their values can be considered fixed for a certain railgun.

the Mathematical Model of Rail-Loop

Figure 4:
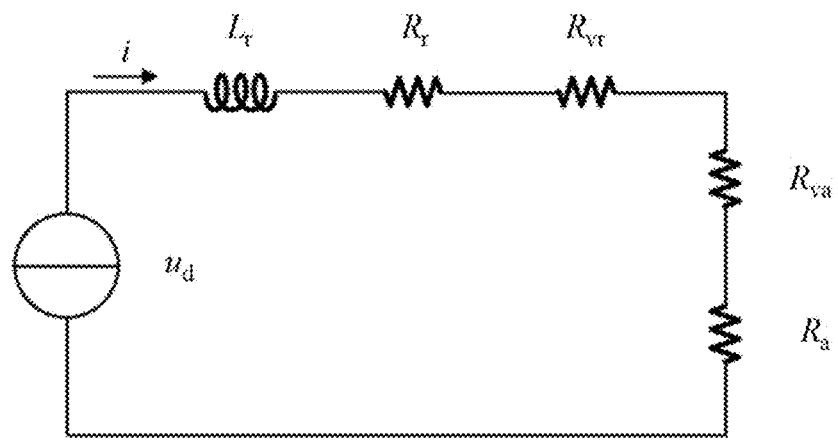
FIG. 4 is a circuit diagram of a rail-loop according to an example of the present invention.

From the above analysis, the circuit diagram shown in FIG. 4 can be obtained, and an equation of current in the rail-loop can be obtained:

$$\frac{di}{dt} = \frac{1}{L_r}\left(u_d - (R_v + R_a + R_r)i - i\frac{dL_r}{dt}\right) \quad (19)$$

Simplifying the Equation (19) and obtaining:

$$\frac{di}{dt} = \frac{1}{L_r}(u_d - (R_v + R_a + R_r)i - L'_r vi) \quad (20)$$

Dynamic Model of Armature
(1) Mathematical Model of Electromagnetic Force

The starting time of the electromagnetic railgun is taken as a zero point. Assuming that at the time t, the displacement of the armature on the rails is x, the total inductance on the rails at this time is $L_r$, and the current flowing through the armature is I, the magnetic field energy generated is expressed as:

$$W = \frac{1}{2}L_r I^2 \quad (21)$$

Wherein, W is the magnetic field energy of the launching system: $L_r$ is the total inductance on the rails.

Assuming that the armature moves a very short displacement in a very short time interval, in the distributed energy storage-type electromagnetic launch system of approximately constant current, the current on the armature is approximately constant, and the electromagnetic force $F_m$ on the armature is:

$$F_m = \frac{dW}{dx} = \frac{1}{2}I^2 \frac{dL_r}{dx} = \frac{1}{2}I^2 L'_r \quad (22)$$

Wherein, $L'_r$ is the inductance gradient of the rails.
(2) Mathematical Model of Sliding Friction Force The movement of the armature on the rails is not only supported and guided, but also hindered by mechanical friction, which hinders the acceleration of the armature towards the muzzle. The resistance caused by friction is equal to the sliding friction coefficient multiplied by the pressure of the armature on the rails, wherein the sliding friction coefficient is a quantity that varies with the speed of the armature. The research results indicate that when the positive pressure is greater than 100N, the sliding friction coefficient u (v) is:

$$\mu(v) = (\mu_H - \mu_G)e^{-bv} + \mu_G \quad (23)$$

Wherein, $\mu_H$ is the static friction coefficient: $\mu_G$ is a limit value of the sliding friction coefficient: b is a constant.

Thus the friction of the rails-to-armature is expressed as:

$$F_f = \mu(v)F_n \quad (24)$$

Wherein, Ff is the frictional force of the armature on the rails; and, $F_n$ is the dynamic normal pressure on the armature.

The axial Lorentz force on the armature can cause radial deformation of the rails. To facilitate analysis and calculation of the dynamic normal pressure $F_n$, the following assumptions can be made:
 (a) The force on the armature is linearly distributed.
 (b) The transformation from an axial stress to a radial stress is described by a linear function (a scaling factor is "k").

Then, the dynamic normal pressure $F_n$ on the armature can be described as:

$$F_n = F_{n0} + \frac{kP}{2A}F_m \quad (25)$$

Wherein, $F_{n0}$ is the normal pressure of preload: k is the ratio coefficient of the axial stress transformed to the radial stress: P is the contact length between the rails and the armature in the radial direction (i.e., the movement direction of the armature): A is the cross-sectional area of the armature.

(3) Mathematical Model of Air Resistance

When the armature moves at high speed, the resistance caused by the compression of the air in front, the friction between the side surface and the air, and the partial vacuum of the space behind the tail can be described as air resistance. The air resistance Fa to the armature can be studied based on the following assumptions:

(a) before the electromagnetic launch, that is, when the armature is not accelerated, the air in the rails is not compressed, and the density of the air d is the standard atmospheric state:

(b) a shock wave is generated instantaneously after the armature acceleration, the compression duration of the air can be ignored:

(c) the density and pressure of the compressed air are uniform, and the specific heat rate is constant; and (d) the compressed air in the bore is consistent with the velocity of the armature v.

The air resistance Fa is calculated as:

$$F_d = \frac{\gamma+1}{2}\rho_d\left(Av^2 + Axa + \frac{1}{2}c_f P v^2 x\right) \quad (26)$$

Wherein, $c_f$ is the coefficient of viscous resistance between the air and the rails; and, a is the acceleration of the armature.

(4) Kinetic Energy Model of Armature

The motion equation of the armature can be expressed in differential equations as:

$$\frac{d^2x}{dt^2} = \frac{dv}{dt} = \frac{F_m - F_f - F_d}{m_a} \quad (27)$$

The launch efficiency of the electromagnetic railgun is the ratio of muzzle kinetic energy to initial energy storage system, which is:

$$\eta = \frac{E_k}{E_0} = \frac{m_a v_a^2}{n_c C U^2} \quad (28)$$

Wherein, $m_a$ is the mass of the armature: $v_a$ is the muzzle velocity of the armature: n is the launch efficiency: $E_k$ is the kinetic energy of the armature: $E_0$ is the total energy storage of the power source system: $n_c$ is the number of the PFU modules participating in the discharging of the distributed energy storage (DES) power source system.

The launching process of the electromagnetic railgun is very complex, and in the whole electromagnetic launching process, the system presents continuous, time-varying and nonlinear dynamic characteristics.

The modular modeling method decomposes a complex system into several relatively independent modules according to certain principles, and those decomposed modules can be systems with specific functions or components in the system: then, build models of each module respectively and define interfaces between each of the modules; and then, connect the modules by certain methods to complete the building of the whole system model.

Furthermore, the modular modeling method decomposes the complex system into several small modules, and the models of each of the small modules can be built by modelers in different fields, which ensures professionalism and credibility, improves parallelism for modeling work, shortens modeling time and improves modeling efficiency. At the same time, the modularization model is beneficial to enhance the cognition of the system working characteristics. Each of the modules can be reused and has strong portability.

In the present example, the visual simulation tool base on Matlab/Simulink which can well simulate the output characteristics of the electromagnetic railgun is used.

Figure 5:
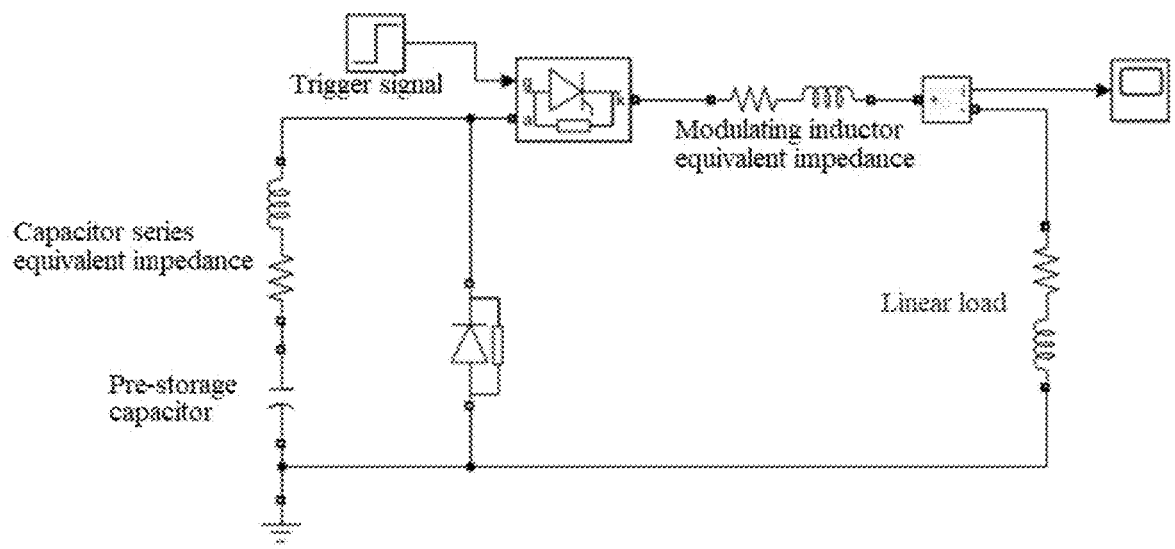
FIG. 5 is a Simulink diagram of the PFU according to an example of the present invention.

In the present example, the "Powerlib" power system module is use to modeling the capacitive energy storage-type impulsing power source, and the PFU consists of energy storage capacitor, wave modulation inductor, series RLC module (capacitor equivalent impedance, linear load), thyristor and diode, as shown in FIG. 5.

Assuming discharge to a linear load, the impedance of the linear load is taken to be 10 mΩ and 5 µH.

(i) Changing the Capacitance of the Storage Capacitor

Figure 6:
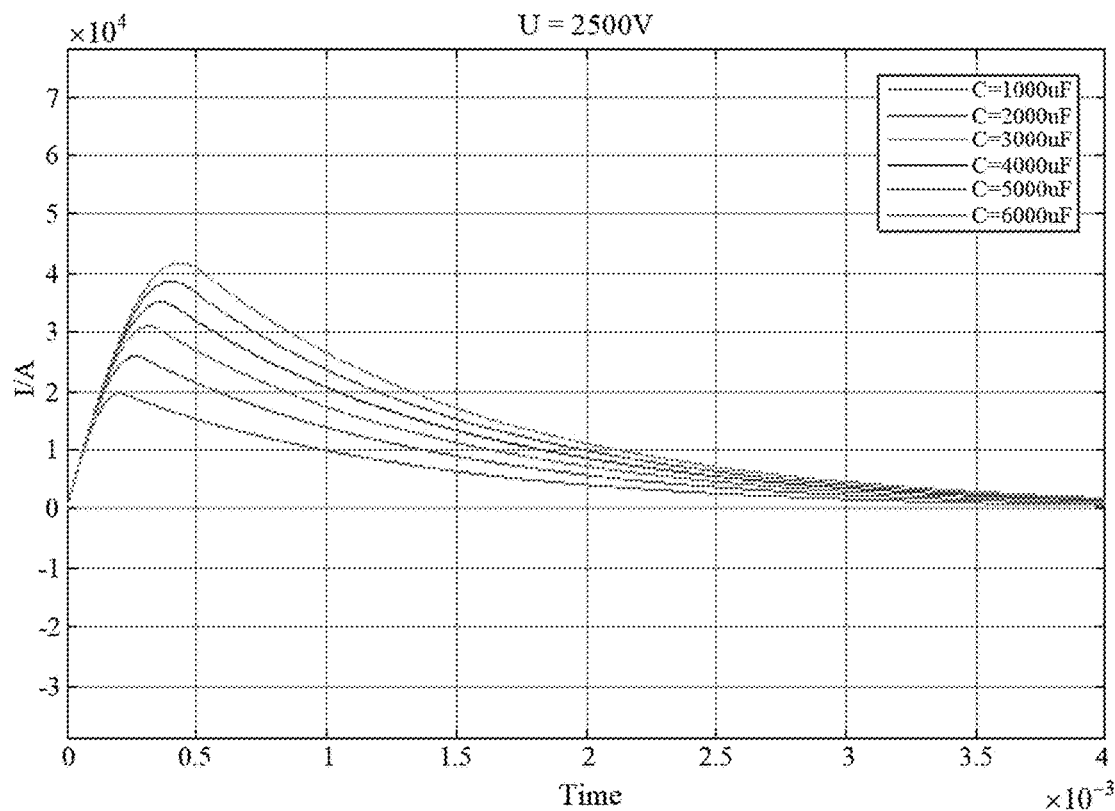
FIG. 6 is a waveform diagram of a pulse current when U=2.5 kV and C takes different values according to an example of the present invention.
Figure 7:
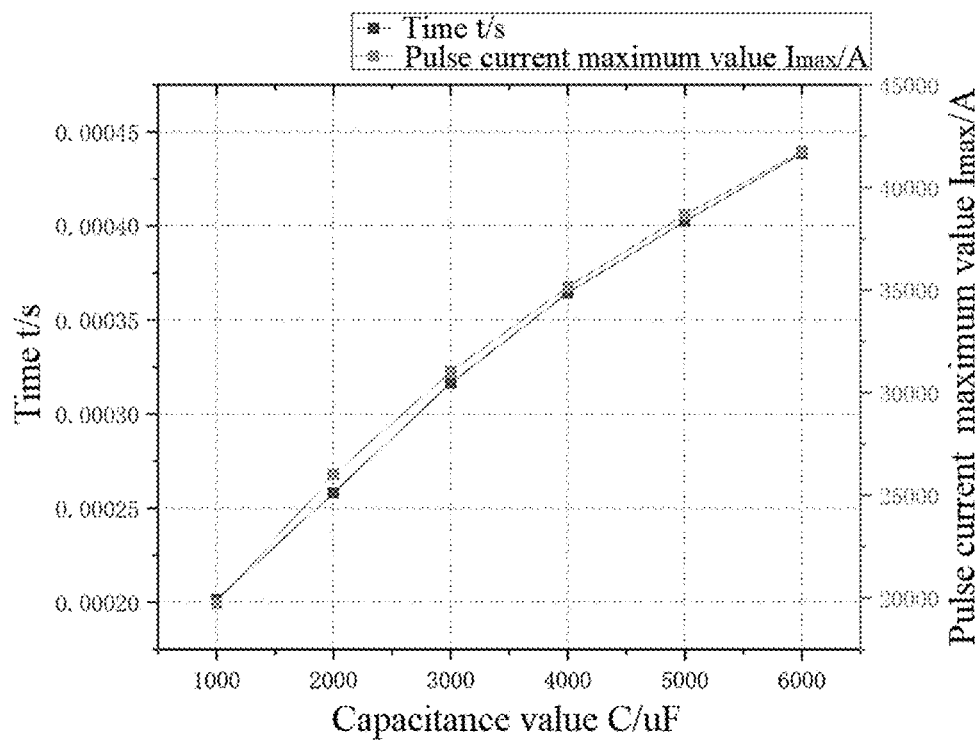
FIG. 7 is a double-Y broken line trend chart of a peak time and a peak value of the pulse current varying with capacitance value according to an example of the present invention.

Under the condition that the capacitor charging voltage U=2.5 kV, changing the capacitance value of the capacitor, wherein C is respectively 1000 µF, 2000 µF, 3000 µF, 4000 µF, 5000 µF and 6000 µF for simulation. The simulation results are shown in FIG. 6. The waveforms with different colors represent different capacitance values of capacitors, the abscissa is discharge time, and the ordinate is magnitude of pulse current. When the charging voltage is constant, with the increase of capacitor capacitance, the longer the time for pulse current to reach a peak value, the peak value of pulse current also increases with the increase of capacitor capacitance, and it can be found that the rising rate of each waveform before reaching the peak value is roughly the same, and the derivative function passing through zero is basically coincident. In order to analyze this more clearly, extracting the peak time and current peak value separately, and using different capacitance values as variables to make the double Y-axis broken line chart shown in FIG. 7.

It can be seen that both the curve of the peak time and the curve of maximum value of the pulse current show an upward trend with the increase of capacitance value. From this, it can be analyzed that when the charging voltage is constant and the capacitance value increases, the peak time also increases, that is, when the capacitance increases, the time when the pulse current reaches the maximum value also increases, and the capacitance value with a difference of 5000 µF has a peak time difference of approximately 0.24 ms. Although the peak time has increased, the maximum value of the pulse current is very different. When C is 1000 µF, $I_{max}$ is 19.7 kA, and when C is 6000 µF, $I_{max}$ is 41.7 kA. When the difference is 5000 µF, the peak value of pulse current can differ by as much as 22 kA. This shows that the selection of the capacitance of the capacitor is very important for the enhancement of the output characteristics of the electromagnetic railgun.

(ii) Changing the Charging Voltage of the Capacitor

Figure 8:
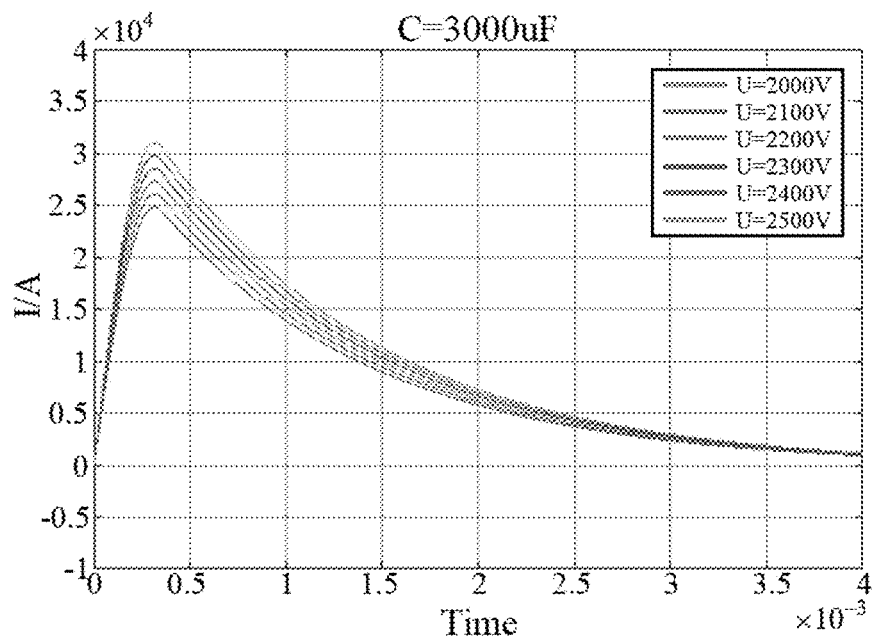
FIG. 8 is a waveform diagram of a pulse current when C-3000 μF and U take different values according to an example of the present invention.
Figure 9:
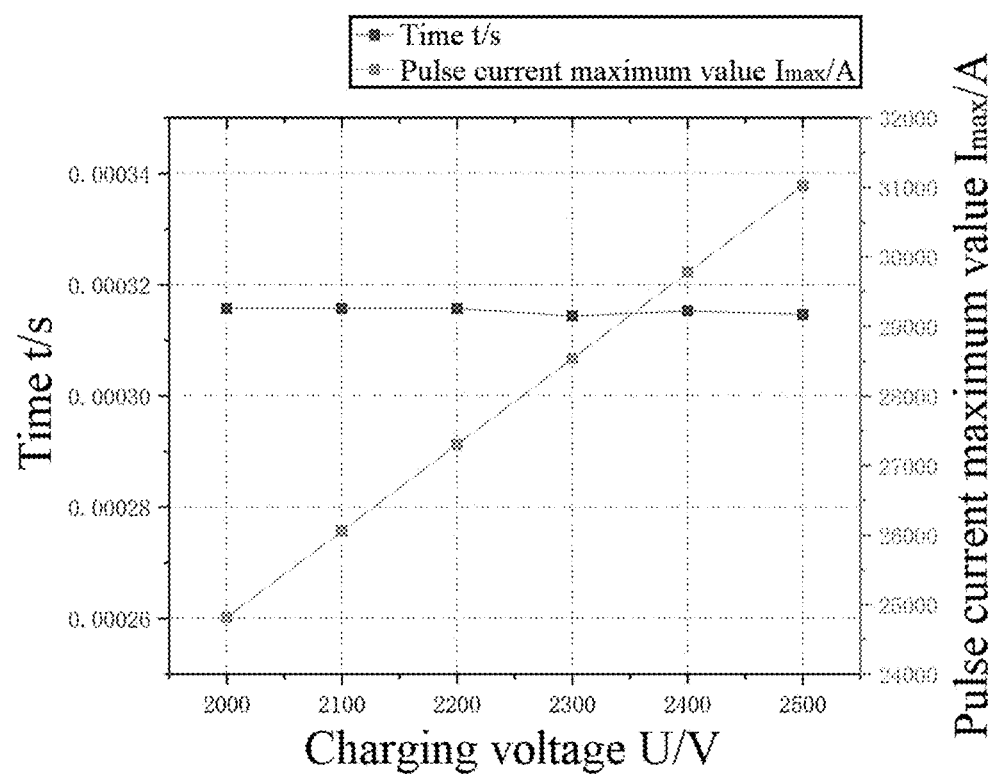
FIG. 9 is a double-Y broken line trend chart of the peak time and the peak value of the pulse current varying with a voltage according to an example of the present invention.

When the capacitor capacitance value C=3000 µF, changing the capacitor charging voltage value, wherein the charging voltage value U is respectively 2000 V, 2100 V, 2200 V, 2300 V, 2400 V, and 2500 V for simulation. The simulation results are shown in FIG. 8. The waveforms with different colors represent different charging voltages of capacitors, the abscissa is discharge time, and the ordinate is pulse current magnitude. Under the situation that the capacitor capacitance is constant, the peak value of the pulse current increases with the increase of the capacitor charging voltage. Different from the voltage being constant and capacitance value being changed, the rise rate of each of the waveforms before reaching the peak value is different, the higher the charging voltage, the faster the rise rate of the pulse current waveform, and the peak time when reaching the respective peak value is roughly the same. In order to analyze this more clearly, extracting the peak time and the current peak value separately, and using different voltage values as variables to make the double Y-axis broken line chart shown in FIG. 9.

It can be seen that the variation curve of the maximum value of the pulse current increases with the increase of the charging voltage, but the peak time is almost a straight line, which does not change with the voltage, or, in other words, it changes very little. It can be analyzed that when the capacitor capacitance value is constant, the charging voltage increases, the peak time is constant, and the maximum value of the pulse current increases.

Through the above analysis and comparison, it can be known that the larger the initial charging voltage, the larger the capacitance of the energy storage capacitor, and the larger the maximum current value in the loop. According to the above results, it can be known that increasing the charging voltage will not significantly change the time when the pulse current reaches the maximum value, while increasing the capacitance value of the capacitor will increase the peak time to a certain extent. Considering the material of the rails, the utilization rate of the rails and the conversion efficiency of the electromagnetic railgun, the initial charging voltage and the capacitance of the storage capacitor cannot be unlimited.

Figure 10:
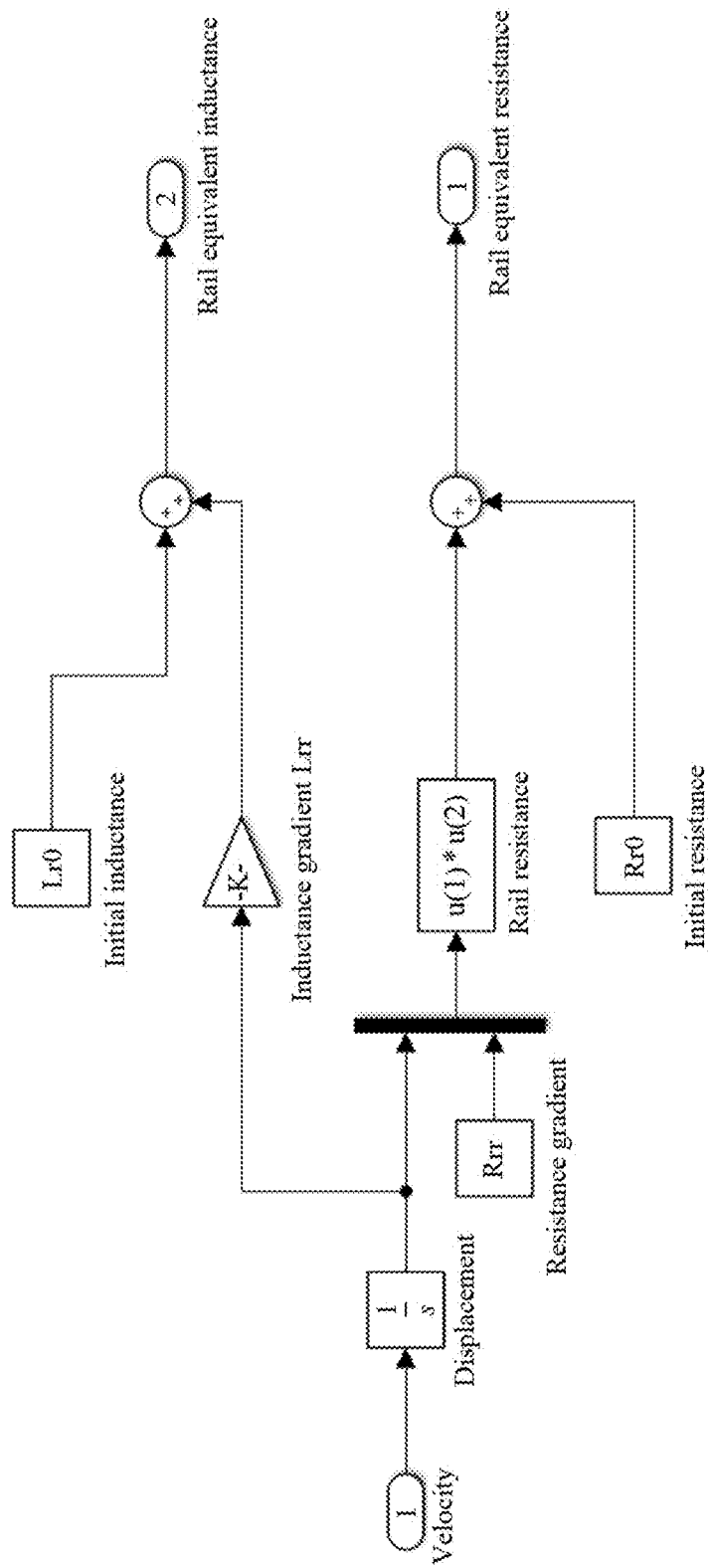
FIG. 10 is a schematic diagram of an equivalent impedance model of rails according to an example of the present invention.

Modeling of Rail/Armature Impedance
(1) Modeling of Equivalent Impedance of Rail
The equivalent impedance model of the rails is built according to equations (11) and (18), as shown in FIG. 10.

Figure 11:
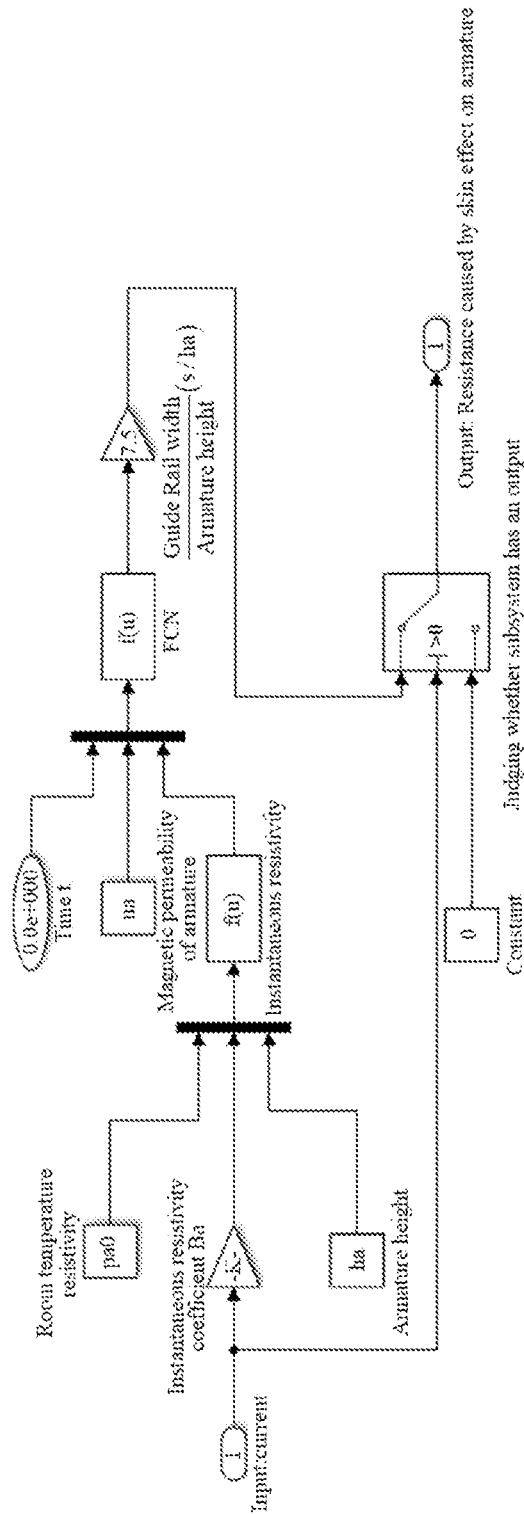
FIG. 11 is a schematic diagram of a model of a resistance caused by a skin effect of current on the armature according to an example of the present invention.

(2) Modeling of Resistance Caused by Skin Effect of Current on Armature
The model of the resistance caused by the skin effect of current is built according to equation (8), as shown in FIG. 11.

Wherein, the clock module is used to provide the time variable t. When the input current of this subsystem is zero and the time is close to infinity, the system will still have a large output, which does not match the actual situation of the electromagnetic launch. Therefore, the Switch module is added to limit the output of the subsystem, using whether the current on the armature is zero as the basis for determining whether the subsystem outputs a resistance value.

Figure 12:
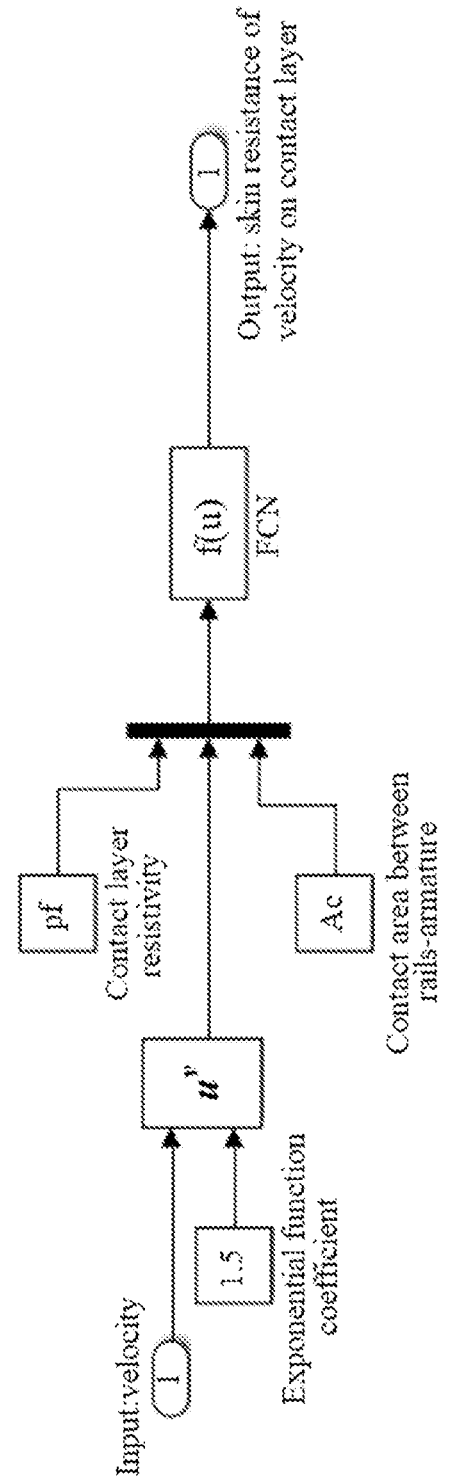
FIG. 12 is a schematic diagram of a model of a contact resistance caused by a skin effect of velocity according to an example of the present invention.

(3) Modeling of Contact Resistance Caused by Skin Effect of Velocity
A model of the contact resistance caused by the skin effect of velocity is built according to Equation (10), as shown in FIG. 12.

Figure 13:
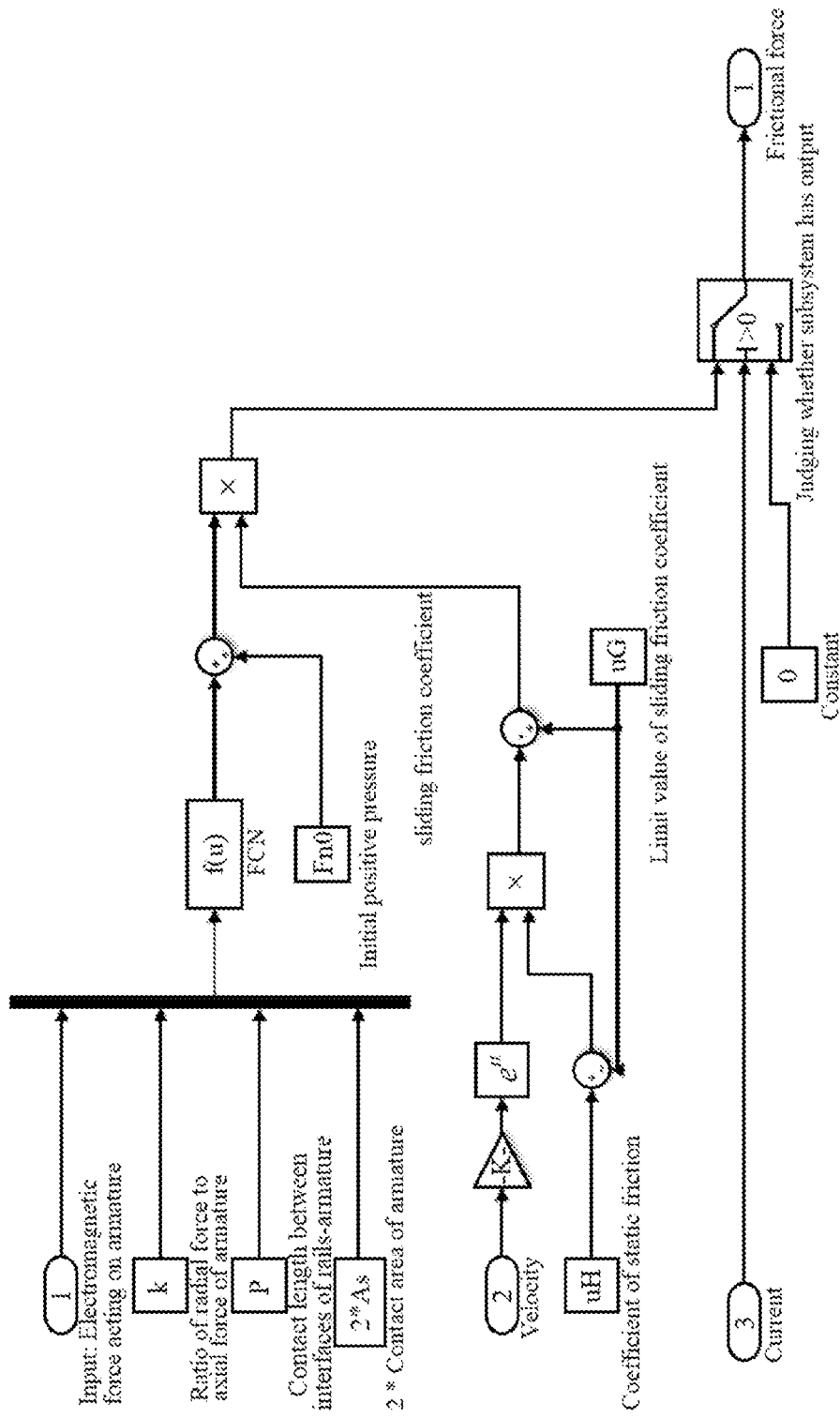
FIG. 13 is a schematic diagram of a sliding friction force model according to an example of the present invention.
Figure 14:
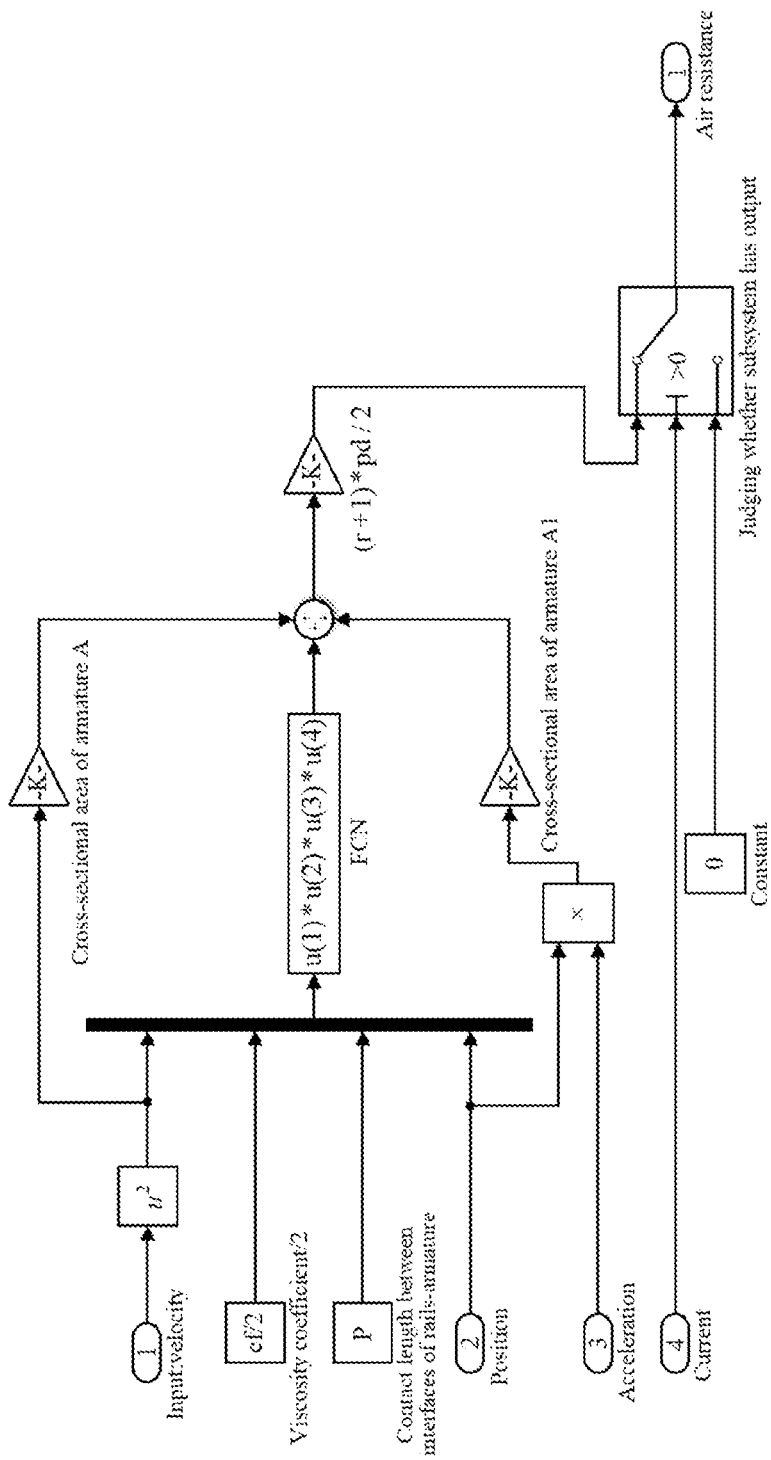
FIG. 14 is a schematic diagram of an air resistance model according to an example of the present invention.
Figure 15:
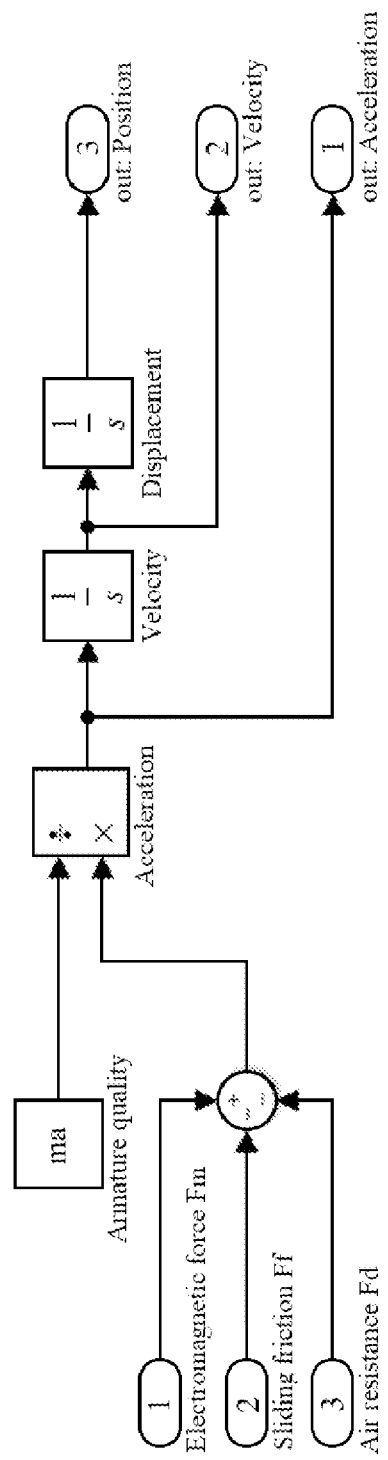
FIG. 15 is a schematic diagram of an armature motion model according to an example of the present invention.
Figure 16:
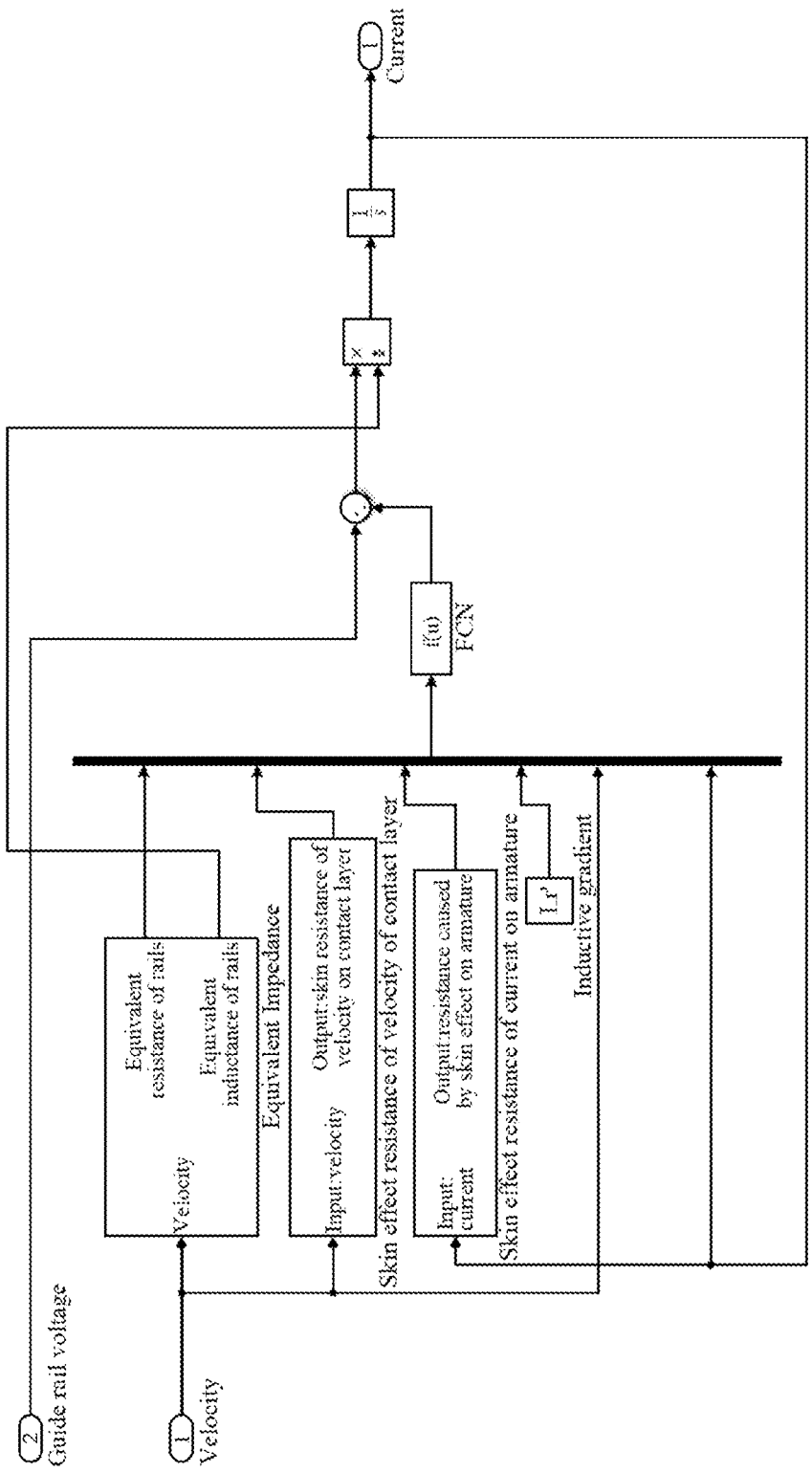
FIG. 16 is a schematic diagram of a rail-loop subsystem model according to an example of the present invention.

Modeling of Armature Dynamics
(1) Sliding Friction Force Model
A sliding friction force subsystem model is built according to Equation (24), as shown in FIG. 13.
(2) Air Resistance Model
An air resistance subsystem model is built according to Equation (26), as shown in FIG. 14.
(3) Armature Motion Model
An armature motion subsystem model is built according to Equation (27), as shown in FIG. 15.
(4) Rail Subsystem Model
A rail-loop subsystem model is built according to Equation (20), as shown in FIG. 16.

Simulation of the Electromagnetic Railgun
(1) Setting of Model Parameters
In the present example, the settings of the parameters of the electromagnetic railgun are shown in Table 1.

TABLE 1

Parameter setting of electromagnetic launching system

| System Parameter | Symbol & Unit | Value |
|---|---|---|
| Capacitor Initial Voltage | U (V) | 2500 |
| Capacitor Capacitance | C (μF) | 3000 |
| Capacitor Equivalent Series Resistance | $R_{ES}$ (mΩ) | 0.25 |
| Capacitor Equivalent Series Inductance | $L_{ES}$ (μH) | 0.05 |
| Resistance Value of Modulating Inductor | $R_L$ (mΩ) | 1 |
| Inductance Value of Modulation Inductor | $L_L$ (μH) | 10 |
| Initial Resistance of Rails | $R_{r0}$ (mΩ) | 0.2 |
| Initial Inductance of Rails | $L_{r0}$ (μH) | 0.97 |
| Resistance Gradient of Rails | $R'_r$ (mΩ/m) | 1 |
| Inductance Gradient of Rails | $L'_r$ (μH/m) | 0.4 |
| Armature Permeability | $\mu_a$ | $4\pi \times 10^{-7}$ |
| Armature Resistivity at Room Temperature | $\rho_a$ (Ω · m$^2$) | $3.2 \times 10^{-8}$ |
| Instantaneous Resistivity Coefficient | $\beta_a$ | $3.6 \times 10^{-16}$ |
| Proportionality Constant of Contact Resistance under Skin Effect of Velocity | $k_v$ | 0.5 |
| Contact Resistivity | $\rho_f$ (Ω · m$^2$) | $1 \times 10^{-12}$ |
| Contact Area between Armature and Rail | $A_c$ (m$^2$) | $4 \times 10^{-4}$ |
| Static Friction Coefficient | $\mu_H$ | 0.45 |
| Limit Value of Sliding Friction Coefficient | $\mu_G$ | 0.05 |
| Coefficient of Sliding Friction Index | b | $3 \times 10^{-2}$ |
| Normal Pressure of Preload | $F_{n0}$ (N) | 680 |
| Axial Diameter Stress Proportionality Coefficient | k | $2.5 \times 10^{-2}$ |
| Radial Contact Length of Armature-to-Rails | P (m) | 0.04 |
| Cross-Sectional Area of Armature | A (m$^2$) | $7.5 \times 10^{-4}$ |
| Specific Heat Ratio | γ | 1.2 |
| Air Density | $\rho_d$ | 1.29 |
| Coefficient Of Viscous Resistance | $c_f$ | $3 \times 10^{-3}$ |
| Armature Mass | $m_a$ (g) | 40 |

Simulation Curve of Model

Figure 17:
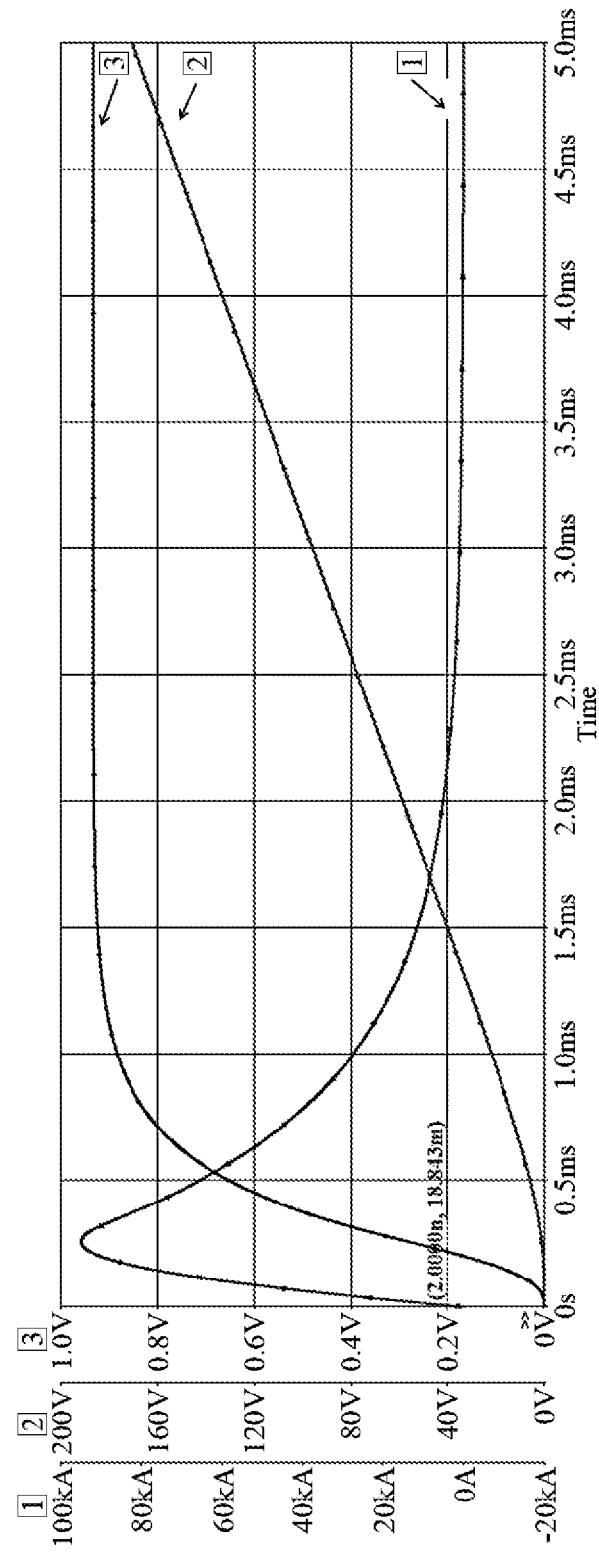
FIG. 17 is a simulation diagram of output characteristics of the electromagnetic railgun according to an example of the present invention.

The simulation curve is shown in FIG. 17. Wherein, the green curve represents rail current, the red curve represents armature speed, and the blue curve represents armature displacement.

Figure 18:
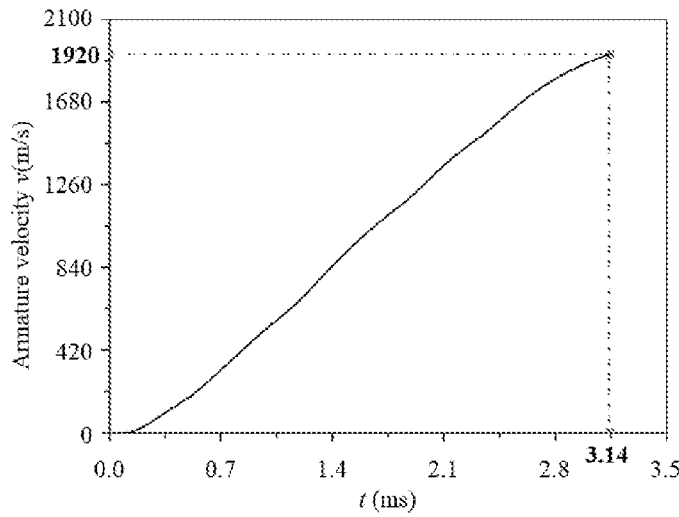
FIG. 18 is a schematic diagram of an armature speed according to an example of the present invention.
Figure 19:
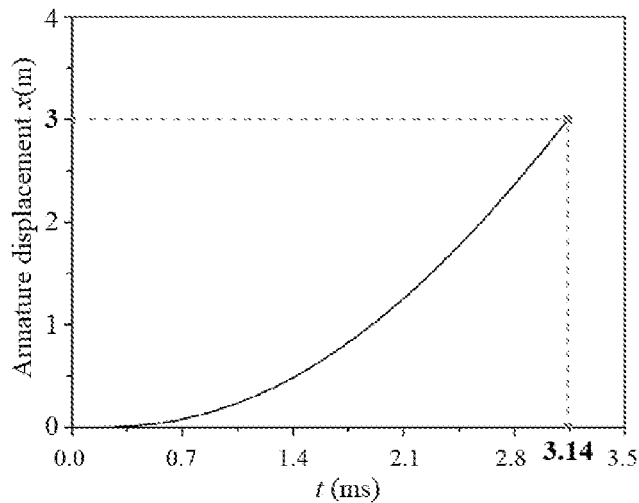
FIG. 19 is a schematic diagram of an armature displacement according to an example of the present invention.

The armature increases in speed before it exits the bore. In the late stage of the launch, the acceleration decreases gradually, and the velocity gradient slows down. As can be seen from FIG. 18, a moment of the armature exiting out is at 3.14 ms and the exiting speed is about 1920 m/s. The armature leaves the bore at 3.14 ms, and the armature displacement is 3 m during the whole firing process, as shown in FIG. 19.

The simulation of multi-field coupling of the electromagnetic railgun is introduced in detail below.

Electromagnetic Field Distribution in Electromagnetic Railgun

The current density and the magnetic induction intensity are important characteristics of the electric field and the magnetic field respectively, and the coupling action and distribution characteristics thereof in rail-type electromagnetic launching device can directly affect the distribution of temperature field, reflecting the heat distribution of the armature, the rails and other parts in the launching process, so that the position where serious electric contact arcing is easy to occur on the rails can be observed through the distribution of electromagnetic field of launching device.

Figure 20:
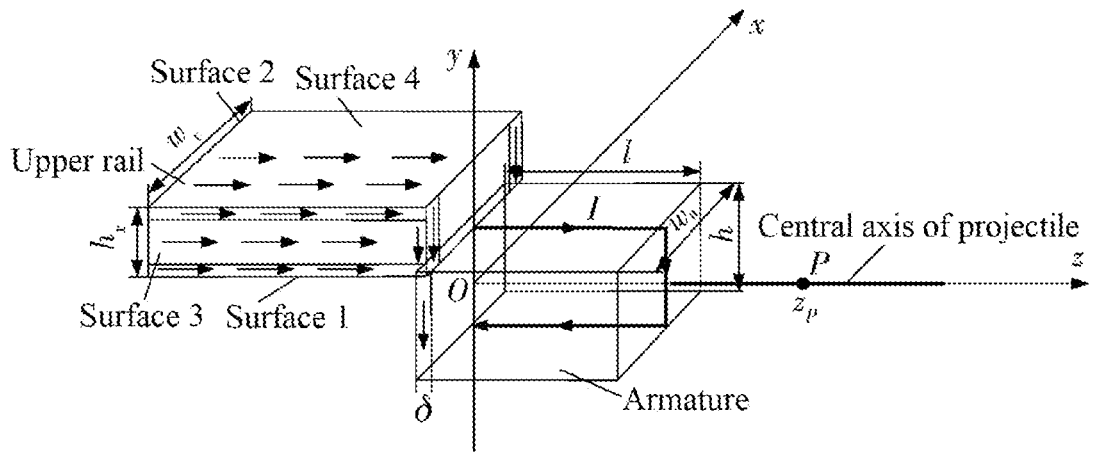
FIG. 20 is a schematic diagram of a calculation model of magnetic field in a bore of the electromagnetic railgun according to an example of the present invention.

FIG. 20 shows the calculation model of the magnetic field in the bore of the electromagnetic railgun bore, wherein, $w_r$ is the width of the rail, $h_r$ is the length of the rail, h is the height of the armature, and $w_a$ is the width of the armature. Further, a current element of the armature is $-J_v dxdyd za_y$, a current element of an upper rail is $J_v dxdyd za_z$, and a current element of a lower rail is $-J_v dxdyd za_z$, where $J_v$ is the current density.

The magnetic field generated by armature current is expressed as:

$$dB = \frac{\mu_0 J_v}{4\pi R^3}[-xdxdydza_z - (z_p - z)dxdydza_x] \quad (28)$$

Wherein, $\mu_0$ is the vacuum permeability.

A distance of the current element (x, y, z) to a point P (0,0, $z_p$) is:

$$\sqrt{R = x^2 + y^2 + (Z_p - z)^2} \quad (29)$$

Performing triple integration on the Equation (28), wherein an integration interval in the X-axis direction is $[-w_a/2, w_a/2]$, an integration interval in the Y-axis direction is $[-h/2, h/2]$, and an integration interval in the Z-axis direction is $[z(t), z(t)+\delta]$, $\delta$ is the skin depth of the current and $\delta = \sqrt{2/\omega\mu\gamma}$, $\omega$ represents the current frequency; $\mu$ and $\gamma$ represent the permeability and conductivity of the conductor, respectively.

Then, the magnetic induction strength of the armature at point P is obtained as follows:

$$\begin{cases} B_{xa} = -\frac{\mu_0 I}{\pi w_a \delta} \int_{z_{p-z(t)-\delta}}^{z_{p-z(t)}} f(z)dz \\ B_{ya} = 0 \\ B_{za} = 0 \end{cases} \quad (30)$$

Wherein, $$f(z) = \arctan\left(\frac{w_a h}{4z\sqrt{z^2 + \left(\frac{w_a}{2}\right)^2 + \left(\frac{h}{2}\right)^2}}\right) \quad (31)$$

The magnetic field generated by the rail current in the upper rail is:

$$dB_u = \frac{\mu_0 J_v}{4\pi R^3}[-xdxdydza_y + ydxdydza_x] \quad (32)$$

The magnetic field generated by the rail current in the lower rail is:

$$dB_l = \frac{\mu_0 J_v}{4\pi R^3}[xdxdydza_y - ydxdydza_x] \quad (33)$$

Performing triple integration on equations (32) and (33), obtaining the magnetic field strength of the rail at point P, as follows:

$$\begin{cases} B_{xr} = \frac{\mu_0 I}{2\pi\delta(2w_r + 2h_r - 4\delta)} \int_{z_{p-z(t)}}^{z_p} (G_1(z) = +G_2(z))dz \\ B_{yr} = 0 \\ B_{zr} = 0 \end{cases} \quad (34)$$

Wherein, $$\begin{cases} G_1(z) = g\left(z, \frac{h}{2} + \delta, \frac{w_r}{2}\right) - g\left(z, \frac{h}{2}, \frac{w_r}{2}\right) + g\left(z, \frac{h}{2} + h_r, \frac{w_r}{2}\right) - g\left(z, \frac{h}{2} + h_r - \delta, \frac{w_r}{2}\right) \\ G_2(z) = g\left(z, \frac{h}{2} + h_r - \delta, \frac{w_r}{2}\right) - g\left(z, \frac{h}{2} + \delta, \frac{w_r}{2}\right) - g\left(z, \frac{h}{2} + h_r - \delta, \frac{w_r}{2} - \delta\right) - g\left(z, \frac{h}{2} + \delta, \frac{w_r}{2} - \delta\right) \\ g(\xi, \varepsilon, \eta) = \ln\left(\sqrt{\xi^2 + \varepsilon^2 + \eta^2} - \eta\right) - \ln\left(\sqrt{\xi^2 + \varepsilon^2 + \eta^2} + \eta\right) \end{cases} \quad (35)$$

Therefore, the magnetic induction at point P is:

$$\begin{cases} B_x = B_{xa} + B_{xr} \\ B_y = B_{ya} + B_{yr} = 0 \\ B_z = B_{za} + B_{zr} = 0 \end{cases} \quad (36)$$

Figure 21:
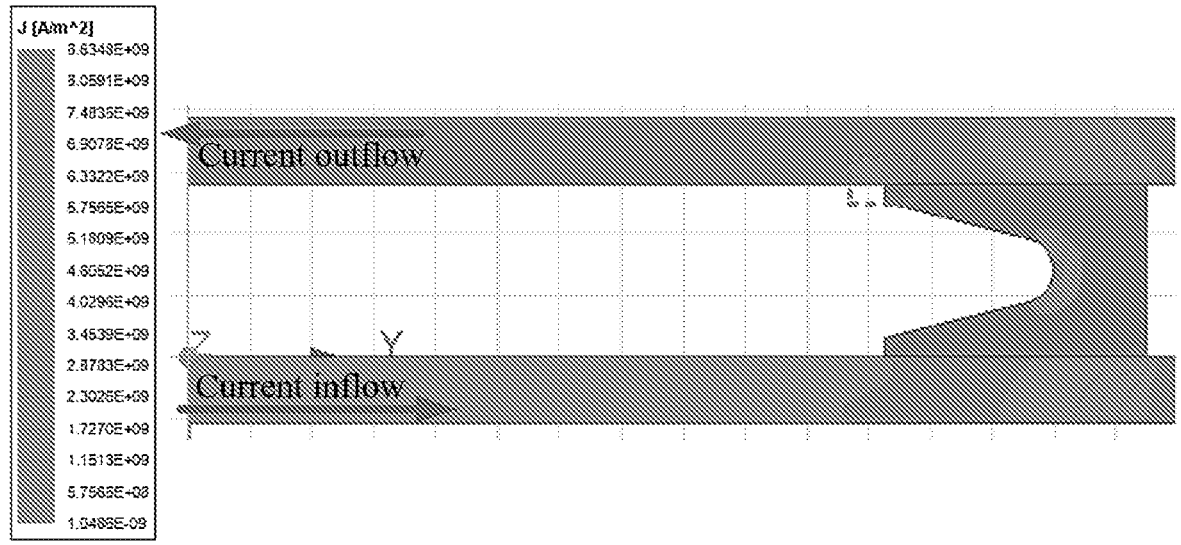
FIG. 21 is a current density distribution diagram of the electromagnetic launching device at 0.6 ms according to an example of the present invention.

The current density distribution of the model is simulated by using a 3D transient field of Maxwell. When the input pulse current reaches the peak value of 20 kV at 0.6 ms, the current density of the electromagnetic railgun system is the highest at this time, and the distribution thereof is shown in FIG. 21.

Figure 22:
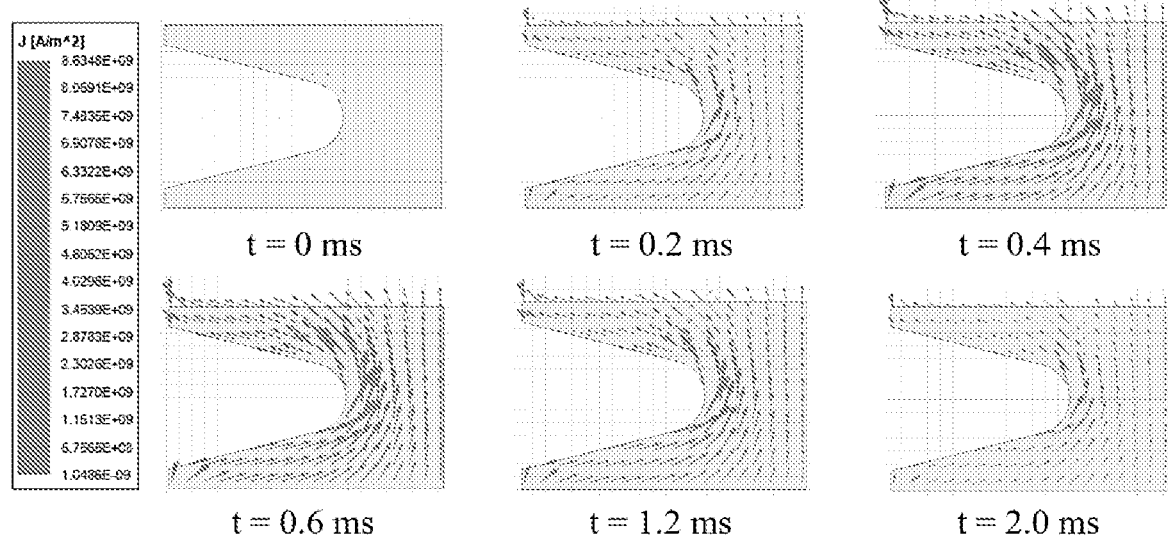
FIG. 22 is a graph showing a distribution of a current density in the armature at different times according to an example of the present invention.

It can be seen that a circulation path of the pulse current input to electromagnetic railgun system is: the pulse current is input from one side rail to the armature, and then flows out from the other side rail to form the loop, so the current density on the rails is mainly distributed in the part before contacting with the armature, and due to the continuous attenuation of potential in the circulation process, the current density on the rail of the current inflow side is higher than that on the rail of the current outflow side, the former is $7.76 \times 10^9$ A/m², and the latter is $7.35 \times 10^9$ A/m². Wherein, the current density around the contact point between the rails and the tail of the armature is the most concentrated, as shown in the red box in FIG. 22, which is $8.72 \times 10^9$ A/m².

Figure 23:
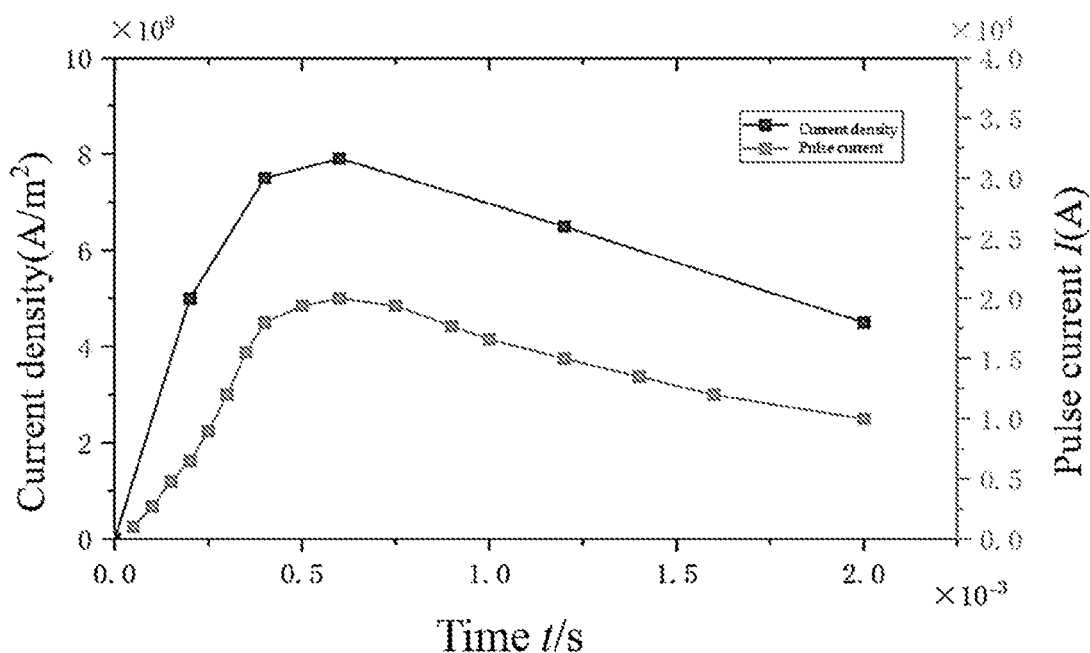
FIG. 23 is a graph showing a variation law of the current density with amplitude of the input pulse current according to an example of the present invention.

In order to observe the variation characteristics of current flow direction and current density distribution with time in the launching process of the armature when the pulse current is input, recording and illustrating the current density distribution of the armature at different times in the launching process, which is shown in FIG. 23.

It can be seen that at any time of the input of the pulse current, the current density of the armature in the launching process is always concentrated in the rear groove. This is because the tail of the armature forms a proximity effect, that is, when currents with opposite flow directions flow through, a strong eddy current and magnetic field will be formed in the middle portion of the parallel conductors, which will bias the total current in the conductors to adjacent sides of the conductors, so the current will be concentrated on the adjacent surfaces of the conductors. At this time, the two tails of the armature can be regarded as conductors flowing through different directions of current, so the armature has the condition of the proximity effect, which makes the current density concentrate in the groove and the inner surface of the tail. Wherein, when the input pulse current reaches the peak value, i.e., at 0.6 ms, the current density in the middle of the groove of the armature reaches $7.91 \times 10^9$ A/m² at most.

Figure 24:
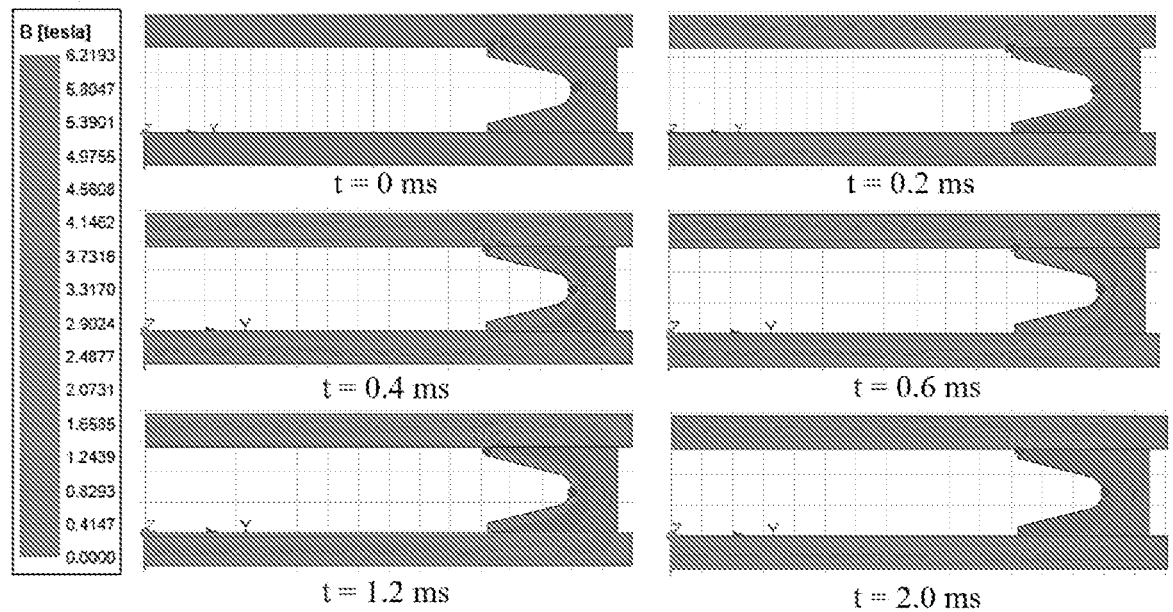
FIG. 24 is a graph showing a distribution of a magnetic induction intensity of the electromagnetic launching device at different times according to an example of the present invention.
Figure 25:
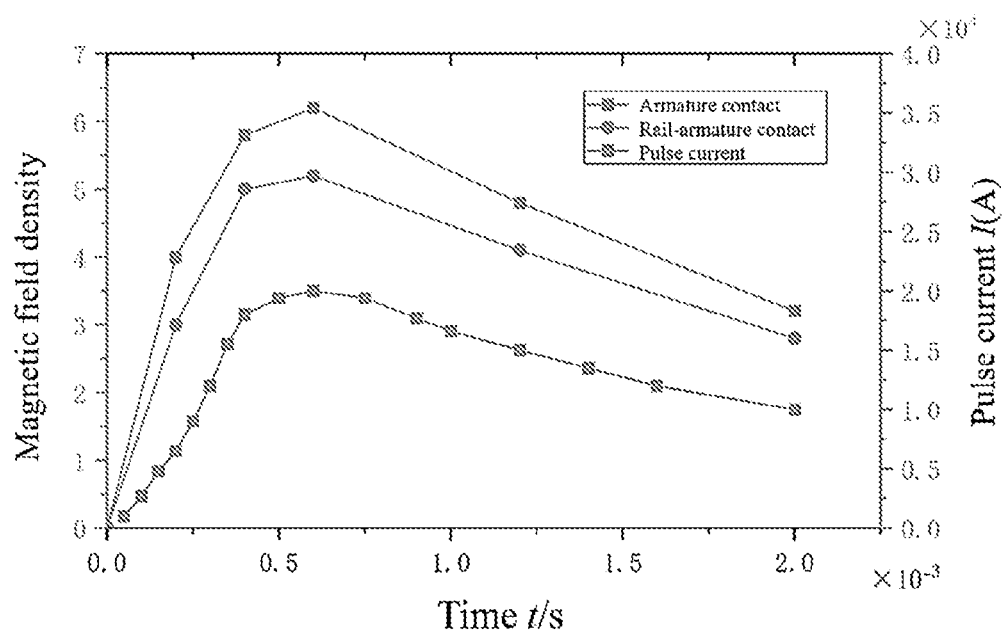
FIG. 25 is a graph showing a variation law of the magnetic induction intensity with the amplitude of the input pulse current according to an example of the present invention.

In order to further explore the relationship between the current density in the armature and the amplitude of the pulse current input to the electromagnetic railgun system, the maximum current density values at the groove of the armature at 6 times in FIG. 24 are selected and plotted as trend charts varying with time to observe the variation law of the current density with the waveform of the input pulse current, as shown in FIG. 25.

It can be seen that the variation law of the maximum current density at the groove of the armature is consistent with that of the amplitude of the input pulse current. When the input pulse current is in the rising duration, the current density increases with the increase of the amplitude of the pulse current, and at 0.6 ms when the input pulse current reaches the maximum peak value of 20 kV, the current density also reaches the maximum value. Then the current density gradually decreases during the falling duration of the input pulse current. Therefore, the pulse current input from the external pulse source to the rail-type electromagnetic launching device determines the current density in the device components, and will directly affect the current density distribution and amplitude range of the whole device during the launching process.

Figure 26:
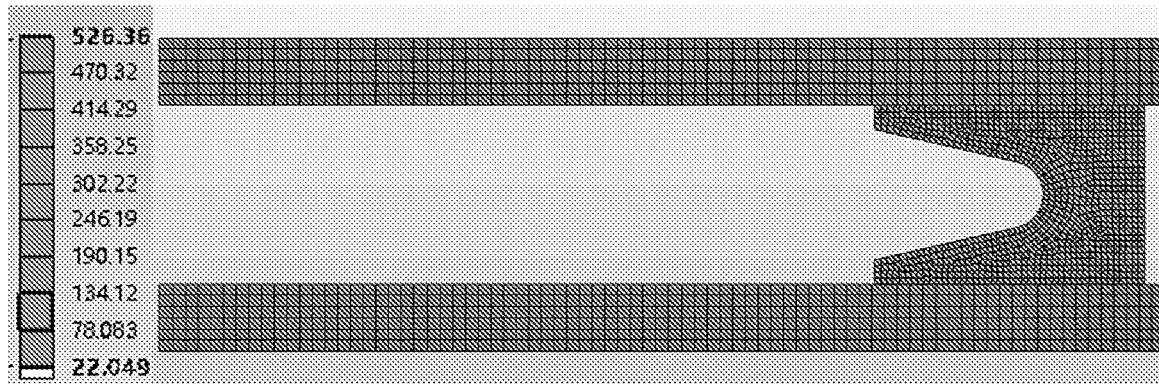
FIG. 26 is a schematic diagram of simulation results of a temperature field at 2 ms according to an example of the present invention.

Simulation of the magnetic induction distribution of the model is performed by using 3D transient field of Maxwell based on the current density distribution results. The simulation results show that the distribution of magnetic induction intensity at 0 ms, 0.2 ms, 0.4 ms, 0.6 ms, 1.2 ms and 2.0 ms (six moments) in the launching process after the pulse current is applied to the electromagnetic launching device, as shown in FIG. 26.

It can be seen that since the distribution of magnetic induction intensity of the electromagnetic railgun system is closely related to the distribution of current density thereof, the distribution of the magnetic induction intensity is roughly the same as that of the current density in FIG. 21, and the parts with high magnetic induction intensity are also concentrated in the groove (m1 point) at the rear of the armature and the inner surface of the tail, and concentrated on the inner surfaces of the two rails due to the proximity effect. Moreover, the magnetic induction intensity around the contact point (m2 point) between the rails and the tail of the armature is also highly concentrated. Wherein, when the input pulse current reaches the peak value, i.e. at 0.6 ms, the maximum magnetic induction intensity appears in the middle of the groove of the armature during the launching process of the electromagnetic railgun, and the maximum magnetic induction intensity reaches 6.15T.

In order to observe the distribution of the magnetic induction intensity of the electromagnetic launching device from multiple angles, the simulation diagram of the magnetic induction intensity distribution of YZ section of the armature and the rails at time of 0.6 ms is obtained, as shown in FIG. 31.

Figure 31A:
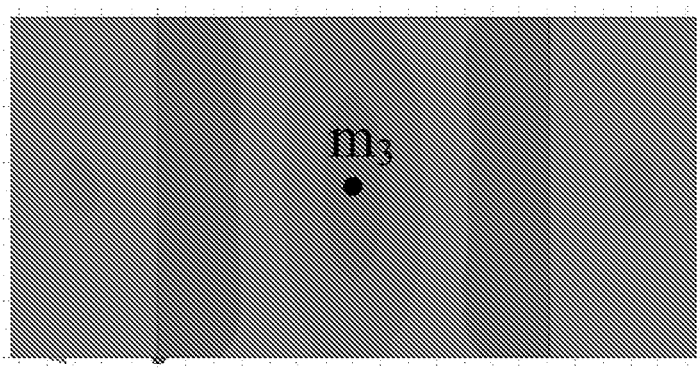
FIG. 31A is a graph showing distribution of a magnetic induction intensity of a YZ section at a groove of the armature at 0.6 ms according to an example of the present invention.
Figure 31B:
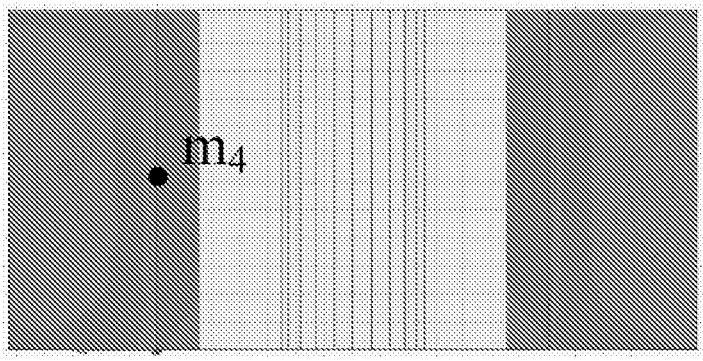
FIG. 31B is a graph showing the distribution of the magnetic induction intensity of the YZ section at the armature-rails contact point at 0.6 ms according to an example of the present invention.

Wherein, FIG. 31A is the YZ section of the groove of the armature, from which it can be seen that the magnetic induction intensity is concentrated and distributed at the groove of the armature, and gradually decreases to both sides of the groove. The magnetic induction intensity at the center position m3 point of the groove is the largest, which can reach 6.2T: while the magnetic induction intensity of the rails is the weakest in the middle position due to the influence of the skin effect of current. FIG. 31B shows the YZ section at the contact point of armature-rails, from which it can be seen that the magnetic induction intensity is maximum at the contact point m4 point between the armature and the rails, and the value can reach 5.46T. Therefore, in the launching process, the magnetic induction intensity of the electromagnetic railgun is mainly concentrated in the groove of the armature and the contact points of armature-rails, which are also the positions where melting and ablation are easy to occur.

In order to further explore the relationship between the magnetic induction intensity and the amplitude of the pulse current input to the electromagnetic railgun, magnetic induction intensity values at the groove of the armature and contact points of armature-rails at 6 moments in FIG. 26 are respectively selected and plotted as trend diagram changing with time, and the variation laws of the magnetic induction intensities $B_1$ and $B_2$ at these two positions with waveform of the input pulse current are observed.

It can be seen that the variation laws of $B_1$ and $B_2$ are consistent with the variation law of the amplitude of the input pulse current. When the input pulse current is in the rising duration, $B_1$ and $B_2$ increases with the increase of the amplitude of the pulse current, and at 0.6 ms when the input pulse current reaches the maximum peak value of 20 kV, the magnetic induction intensities at the two positions reach the maximum values. After that, $B_1$ and $B_2$ decrease gradually in the falling duration of the input pulse current. The magnetic induction intensity $B_1$ at the groove of the armature is larger than the magnetic induction intensity $B_2$ at the contact point of armature-rails at any time during the launching process, which is the most concentrated part of the electromagnetic launching device. The distribution characteristics of these magnetic induction intensities are consistent with the simulation results at different times in FIG. 25. Therefore, the pulse current input from the external pulse source to the electromagnetic railgun system will affect the magnetic induction intensities in the device parts through the distribution characteristics of the current density, and will have a direct effect on the magnetic induction intensity distribution and the amplitude range of the whole device during the launching process.

Analysis of Temperature Field in Electromagnetic Launching Process (1) Heat Source Analysis The source of the heat in the electromagnetic rail launching process mainly comprises three parts.

The first part is a Joule heat $Q_1$ generated by resistances of the armatures and the rails themselves, which is:

$$Q_1 = \int_0^{t_1} \frac{i(t)^2 L}{\delta A} dt \tag{37}$$

Wherein, $t_1$ is the time for the current to pass through the rails, unit is s; i is the input pulse current value, unit is A; L is the length of the rails behind the armature, unit is m; A is the cross-sectional area of the current portion on the rails, unit is $m^2$; and, $\delta$ is the skin depth, unit is m.

The second part is a heat $Q_2$ generated by the contact resistance on the contact surface between the armature and the rails. According to the theory of electrical contact, when two metals are in contact with each other on the surface, the contact surface is not completely contacted, but consists of some contact spots, and there is an oxide film. When the armature begins to be launched between the two rails, the surface oxide film is destroyed, direct contact between metals can be made, and the contact spots begin to conduct electricity. The calculation equation of the contact resistance is:

$$R_c = \frac{\rho_1 + \rho_2}{4} \left( \frac{\pi H}{n \eta F_n} \right)^{\frac{1}{2}} \tag{38}$$

Wherein, $P_1$ and $P_2$ are the resistivity of the armature and the rail, respectively: H is the hardness of a softer material in a contact pair of armature-rails: n is number of the contact spots; and, η is the correction coefficient of elastic deformation. Thus, the generated heat $Q_2$ is:

$$Q_2 = \int_0^{t_1} i(t)^2 R_c(t) dt \tag{39}$$

The third part is a heat $Q_3$ generated by the friction between the armature and the rails, which is:

$$Q_3 = \int_0^{t_1} \mu_1 F_n v \, dt \tag{40}$$

Wherein, $F_n$ is the contact pressure between the armature and the rails, unit is N; and, v is the motion speed of the armature, unit is m/s.

During the launching process of the electromagnetic railgun, the superposition effect of these three kinds of heat will form local high temperature on the surface of the components, and if the temperature is too high, it will affect the electrical and mechanical properties of the material, such as ablation and wear will occur, and even more severe arc ablation can occur due to arcing in the gap due to contact spot separation between the armature and the rails, in particular, it is easy to cause serious damage to the surfaces of the rails and the surface of the armature. Therefore, it is necessary to analyze the temperature field distribution of the electromagnetic railgun during the launching process, so as to more intuitively clarify the temperature rise and local heat concentration of components, and judge the position where the device is prone to ablation and other damages.

Figure 27:
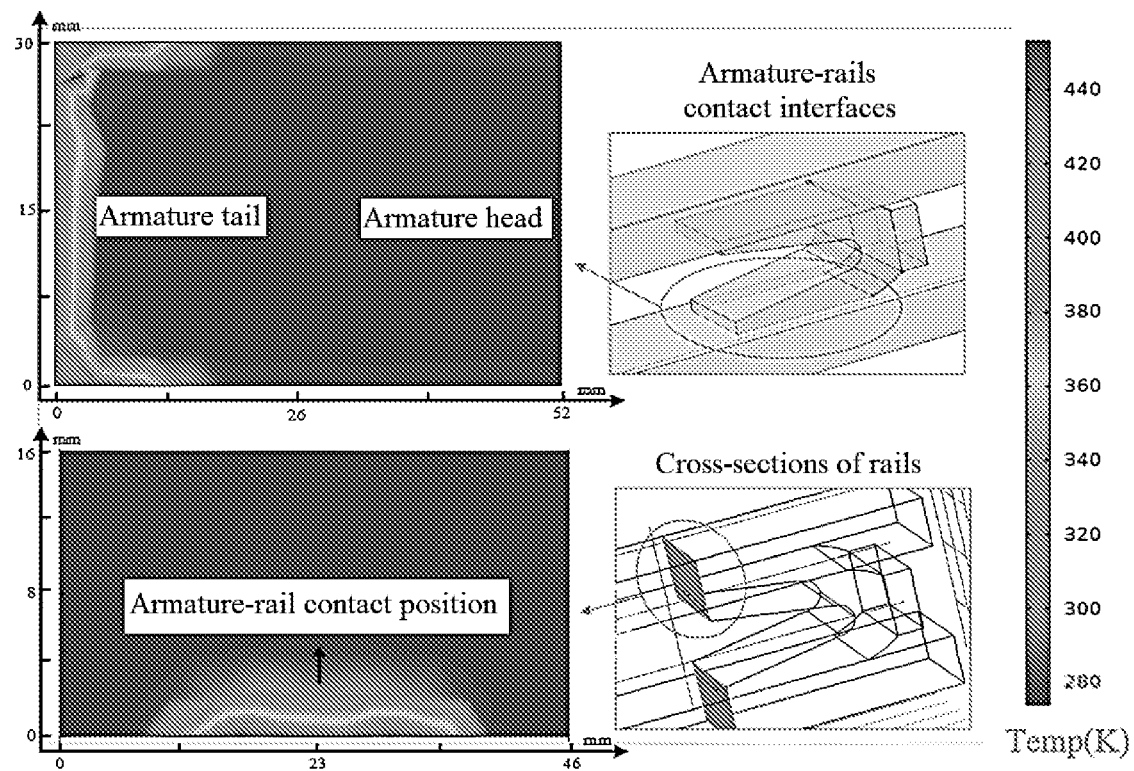
FIG. 27 is a distribution diagram of temperature of an armature-rails cross section according to an example of the present invention.

(ii) Characteristics of the Temperature Distribution of the Electromagnetic Railgun System The simulation-analysis of the temperature field of the electromagnetic railgun system under electromagnetic coupling is carried out through importing the calculation results of the electromagnetic field model into a transient thermal solution module. FIG. 26 shows the temperature distribution of the device at moment 2.0 ms during the launching. It can be seen that the most concentrated area of the armature heat is in the rear groove, which is also the highest temperature position of the whole electromagnetic launching device, indicating that most of the Joule heat generated by current is concentrated in the groove position at the rear of the armature. This is basically consistent with the distribution characteristics of the current density and the magnetic induction intensity in the armature. And the rail receives the superposition of the Joule heat generated by the input current, the friction heat generated by the friction between the rails and the armature, and the heat generated by contact resistance at the same time in the launching process, so that the rails become a component with concentrated temperature distribution next to the groove of the armature. The temperature distribution at the armature-rails contact interface was further analyzed as shown in FIG. 27.

It can be seen that the high temperature region on the contact surface between the armature and the rails is mainly concentrated in a thin layer of the tail, which is consistent with the current density distribution characteristics under the skin effect. Taking the YZ cross-section of the rails at the contact with the tail of the armature, it can be found that the maximum temperature is also concentrated on the inner edges, and the consistency with the current distribution also verifies the validity of the model. The difference is that the diffusion depth of the temperature is smaller than that of current density at the same time, because the temperature of the launching device increases with the diffusion of the current, and is affected by magnetic diffusion and the skin effect of velocity, showing a certain degree of hysteresis.

Figure 28:
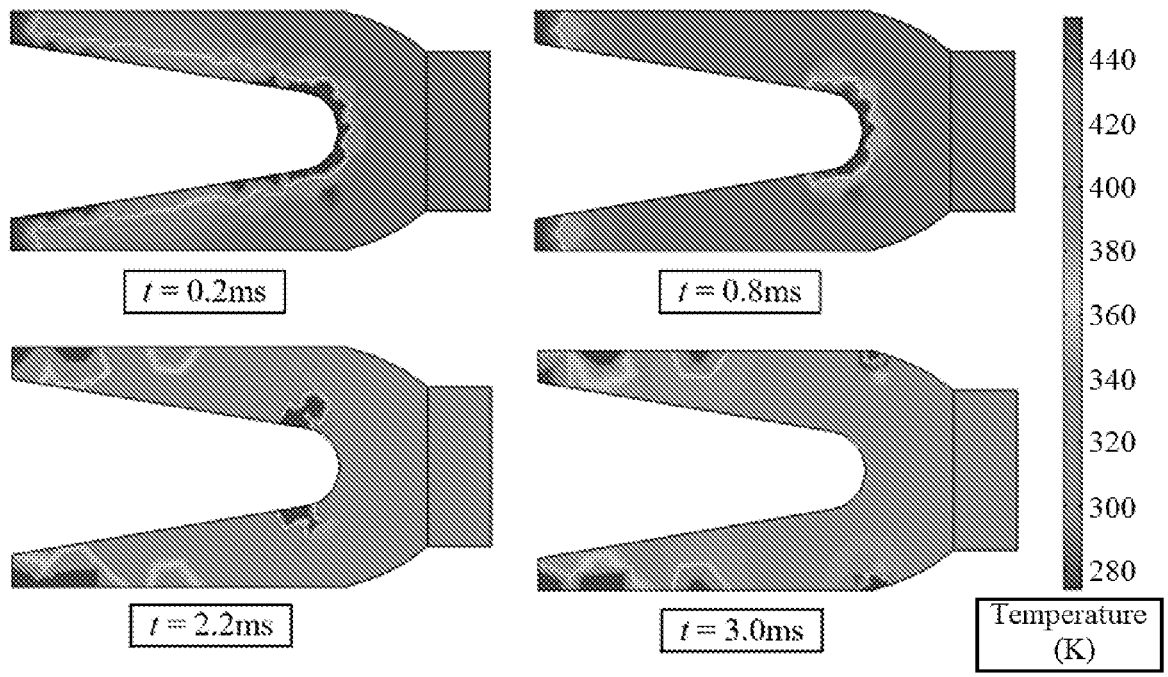
FIG. 28 is a distribution diagram of temperature of the armature at different times according to an example of the present invention.

The electromagnetic railgun works under the condition of strong current and high magnetic field, and the speed can reach several kilometers per second in a few milliseconds. The time-varying characteristics of the armature temperature are explored. The results are shown in FIG. 28.

It can be seen that the armature needs to overcome the friction force to do work in the early stage of motion, the trapezoidal current excitation is still in the rising stage, and the transient skin effect and proximity effect make it close to the inner side of the rails which forms a loop with the edge of the armature. The temperature reflects the concentrated distribution of the friction heat and the Joule heat of the contact resistance in this stage. After 0.5 ms, the current rises to the peak value, the armature has entered the high-speed movement stage, and the contact time between the armature and the rails becomes shorter. At this time, the flow time of the tail at the rear of the armature is the longest, due to the curvature of the inner corner, especially the inflection point, is large, which inhibits the diffusion of current, the accumulation of the heat makes the high temperature area gradually gather to these two parts. As the armature continues to accelerate, the skin effect of velocity becomes obvious and even dominant. The current no longer clings to the armature-rails inner walls completely, but diffuses to all directions. The temperature of the edge decreases gradually. The hot spots of high temperature are concentrated on the sharp edge of the tail and the inflection point of the C-type armature, which is also the position where the armature is most likely to be ablated during service. After 2.5 ms, the current is on the falling edge, and the high temperature region is also diffused and weakened.

The operation condition of the electromagnetic railgun system involves the coupling action of multiple physical fields such as complex electromagnetic and thermal fields, etc., and there are many factors affecting the temperature characteristics of the system. Considering that the main heat source between the armature and the rails is the Joule heat and it will accumulate or diffuse with time, the influence of the waveform of the applied current on temperature distribution is further explored.

Figure 29:
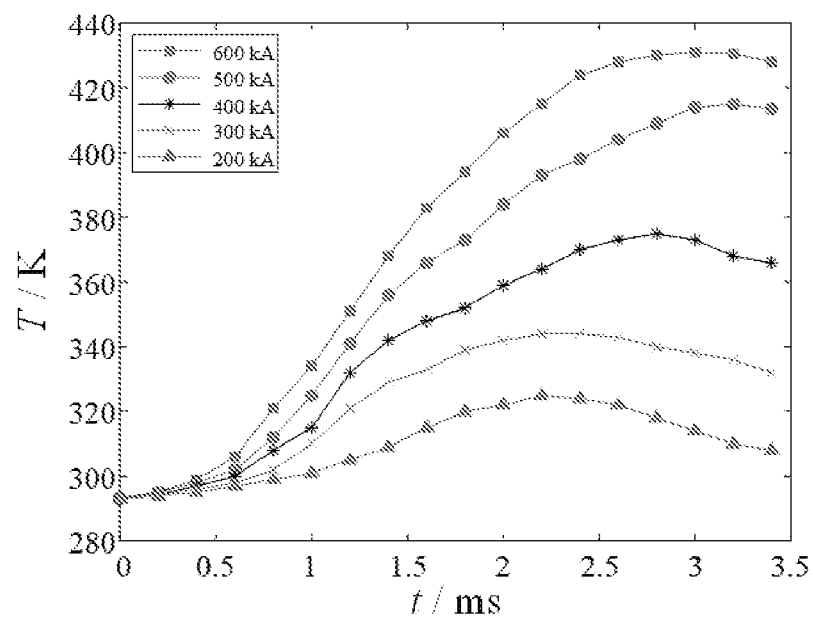
FIG. 29 is a schematic diagram of change results of temperature under different current peaks according to an example of the present invention.

Firstly, keeping a waveform of a trapezoidal current constant at each stage, and exploring the influence of the amplitude of the applied current. FIG. 29 shows the variation of the highest temperature value in the electromagnetic railgun system under 200-600 kA.

It can be seen that under the five levels of current excitation, the overall trend of temperature is roughly from an initial value of 293.15K, gradually rising to the highest value, and then the growth rate slows down or there is a small decrease. And the high temperature area is concentrated on the inner sides of the rails and the tail and the corners of the armature. The larger the current amplitude is, the larger the maximum value of the peak temperature of the armature-rails is. This is because the peak value of the applied current decreases, the current density in the loop decreases, and the armature-rails temperature rise dominated by Joule heat also decreases.

Furthermore, the influence of rise-fall time of applied current is explored. Keeping the amplitude of current at 400 kA and the pulse width of a flat edge at 2 ms, the rising edge and falling edge times of the trapezoidal current are changed. Setting the rising phase time as 0.1 ms, 0.3 ms, 0.5 ms, 0.7 ms and 0.9 ms, respectively, and setting the corresponding falling phase time as 1.4 ms, 1.2 ms, 1.0 ms, 0.8 ms and 0.6 ms, respectively, that is, the whole feeding duration is 3.5 ms. The armature-rails peak temperature variation is shown in FIG. 30.

Figure 30:
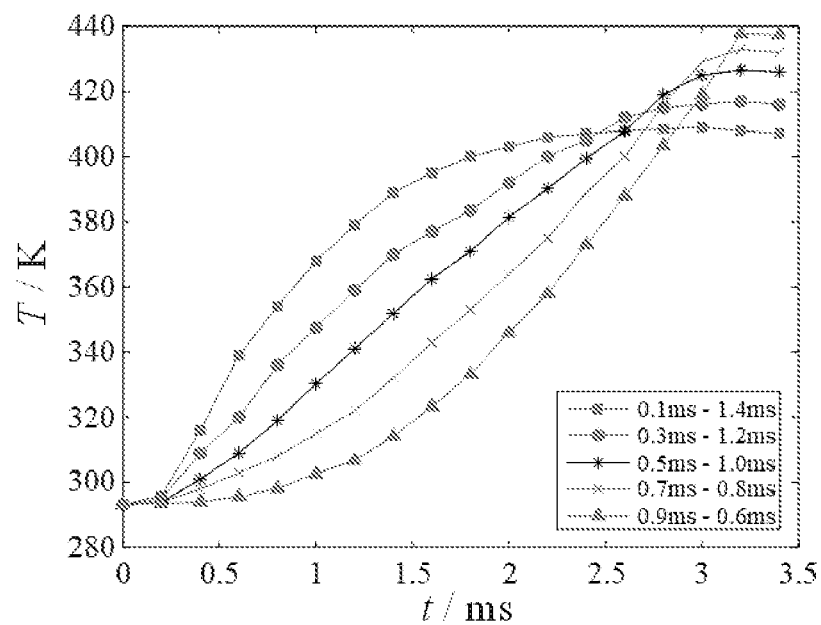
FIG. 30 is a schematic diagram of change results of temperature under different current waveforms according to an example of the present invention.

As shown in FIG. 30, when keeping the current peak value constant and changing the rise-fall edge time, the variation trend of the armature-rails peak temperature is gradually increased first and then stabilized, and finally decreases. The shorter the rise time of trapezoidal current wave is, the faster the initial temperature rise rate is, and the armature and the rails can reach a very high temperature in a short time. However, as the current reaches its peak value and enters the falling edge stage, the temperature growth rate slows down or even decreases. Analyzing the entire simulation process and heat source, the sliding friction heat between the armature and the rails is proportional to relative velocity; and the waveform of excitation source will affect the armature velocity. The slower the rise rate of the current is, the longer the acceleration time required by the armature, the slower the movement speed in the initial stage, and the slower the Joule heat and friction heat are generated, so the initial temperature rise is not obvious. However, the heat accumulation time is longer and the current drop time is shorter in the later period, so the heat has not time to diffuse, showing a higher temperature peak.

To sum up, the distribution situation of the current density reflects the current flow in the armature and the rails in the launching process. The current density is concentrated at the contact points between the armature and the rails, especially at the groove of the armature and around the contact points between the rails of the armature and the rails. This concentrated current density results in localized Joule heat and heat accumulation.

The distribution of the magnetic induction intensity is closely related to the current density, reflecting the distribution of the magnetic field generated when the current passes through. Areas of high magnetic induction intensity are also concentrated at the groove of the armature and around the contact points between the rails and the tail of the armature, and on the inner surfaces of the two rails due to the proximity effect. High magnetic induction in these areas affects heat distribution and heat accumulation in surrounding materials.

The distributions of the current density and the magnetic induction intensity reflect the distribution characteristics of the electromagnetic field, and the distribution of electromagnetic field directly affects the heat distribution of materials. Concentrated current density and magnetic induction can lead to localized heat concentrations and temperature increases, especially at the groove of the armature and around the contact points between the rails and the tail of the armature. High temperatures in these areas may lead to ablation, wear and even electrical arcing of the material.

By observing the distribution of the electromagnetic field, it can help identify the positions on the rails where serious electrical contact arcing is likely to occur, and then take corresponding measures to prevent and mitigate the occurrence of these problems, and improve the reliability and safety of the rail-type electromagnetic launching device.

Specifically comprising:

1) Optimization of armature-rails structure. Changing the geometric shape of the armature, such as adopting special shapes such as C-shape, concave shape or saddle shape to improve the current density distribution and reduce local high temperature and ablation: adopting the rail with special cross-section such as T-shape, annular shape or crescent shape to reduce the current density and reduce ablation: designing a smoother armature-rails contact interface to reduce the concentration of the electric heat on the tail part of the armature and reduce the ablation risk.

2) Material surface modification. Selecting materials with high thermal conductivity and high melting point to manufacture the armature and the rails, or preparing conductive coating on the surface of armature-rail, such as tin alloy, graphene or composite coating, to improve electrical contact state and reduce mechanical wear and arc ablation: considering using low temperature plasma and magnetic field directional restraint to improve the conductivity of armature-rails contact surface, increasing current diffusion rate and reducing skin effect of current.

3) Optimization of launching parameters. Reasonably adjusting system parameters such as current intensity and launching speed to avoid serious current erosion at each speed stage: shortening the arc existence time between the armature and the rails to reduce arc erosion: adjusting initial contact pressure to reduce contact resistance to reduce ablation caused by current concentration; controlling the output current waveform of pulsed energy storage power source to make it smoother and reduce the transient peak value of current, thus reducing ablation risk.

4) Regular inspection and maintenance. Using high-precision temperature sensors, current monitors and other equipment to regularly inspect the rails and the electrical contact points, especially after high-power launching, evaluating the wear, ablation and corrosion state of the rails, and timely discovering hidden danger areas prone to ablation or arc, and carrying out necessary maintenance or replacement.

The foregoing descriptions are merely preferred embodiments of the present invention but are not intended to limit the present invention. A person skilled in art may make various alterations and variations to the present invention. Any modification, equivalent replacement, or improvement made by a person skilled in the art without creative labor within the spirit and principle of the present invention shall fall within the protection scope of the present invention.

The invention claimed is:

1. A method for modeling-simulation and multi-field coupling analysis of an electromagnetic railgun system before launching process to ensure the reliability and safety of the electromagnetic railgun system, comprising the following steps:

building, respectively, a mathematical model of pulse shaping unit, a mathematical model of armature impedance, a mathematical model of rail and a dynamic model of armature of an electromagnetic railgun system;

forming, by using a modularization method, a simulation model of the electromagnetic railgun based on each of the built models;

carrying out a three-dimensional coupling simulation on a current density and a magnetic induction intensity distribution of the simulation model of the electromagnetic railgun, and analyzing a coupling action and distribution characteristics of an electromagnetic field in a launching process of the electromagnetic railgun and an influence of the electromagnetic field on a temperature field distribution; and, determining, based on the analysis result, positions where a severe ablation appeared and/or where an electric contact arcing to be generated on the electromagnetic railgun and taking corresponding actions to prevent and mitigate the occurrence of the severe ablation and/or the electric contact arcing;

wherein:

a specific process of building the mathematical model of pulse shaping unit of the electromagnetic railgun system comprises: building a model of topological structure according to a topological structure of the pulse shaping unit; dividing a discharge process into a discharge stage and a freewheeling stage according to whether a freewheeling diode is turned on or not when the model of topological structure is provided with a linear load; and, building circuit equations of the two stages respectively to form the mathematical model of pulse shaping unit;

a specific process of building the mathematical model of armature impedance of the electromagnetic railgun system comprises: expressing a resistance caused by a skin effect of current on an armature, dividing a contact resistance caused by a skin effect of velocity into two parts, comprising a contact resistance under skin effect of velocity on rails and a contact resistance under skin effect of velocity on the armature, and respectively expressing each part to form the mathematical model of armature impedance;

a specific process of building the mathematical model of rail of the electromagnetic railgun system comprises: constructing an expression of resistance of the rails, calculating a resistance gradient of the rails, expressing a skin depth of the rails in combination with the calculated resistance gradient, and constructing a loop current expression of the rails based on a circuit structure of the rails; and a specific process of building the dynamic model of armature of the electromagnetic railgun system comprises: calculating an electromagnetic force on the armature based on magnetic field energy of a launching system, expressing a friction force between the rails and the armature based on a sliding friction coefficient;

expressing a dynamic normal pressure on the armature under assumptions that a force acting on the armature is linearly distributed and that a transformation from an axial stress to a radial stress is described by a linear function;

expressing an air resistance under assumptions that a density of an air being uncompressed in the rails before electromagnetic launch is of a standard atmospheric state, that a time taken for the air to be compressed is ignored when a shock wave is generated immediately after an armature acceleration, that the density and pressure of the air being compressed are uniform and a specific heat rate is constant, and that the speed of the air being compressed in the rails is consistent with that of the armature; and expressing, in a form of differential equation, a motion equation of the armature based on the friction force between the rails and the armature, the dynamic normal pressure on the armature and the air resistance.

2. The method for modeling-simulation and multi-field coupling analysis of the electromagnetic railgun system according to claim 1, wherein a specific process of carrying out the coupling simulation on the current density and the magnetic induction intensity distribution of the simulation model of the electromagnetic railgun comprises: simulating a distribution of the current density of the simulation model by using a transient field, recording a flow direction of a current and change characteristics of the distribution of the current density along with time in a launching process of the armature when a pulse current is input, determining the distribution of the current density of the armature at different times in the launching process, selecting maximum current density values at a groove of the armature at a plurality of times, drawing a trend diagram along with time, and recording a variation rule of the current density along with a waveform of the input pulse current; and simulating the magnetic induction intensity of the simulation model based on distribution results of the current density under the transient field, determining areas with concentrated distribution of the magnetic induction intensity of an electromagnetic launching device in the launching process, selecting magnetic induction intensity values at the groove of the armature and contact points of armature-rails at several times, drawing the selected magnetic induction intensity values as a trend graph varying with time, and recording a variation law of the magnetic induction intensity with the waveform of the input pulse current.

3. The method for modeling-simulation and multi-field coupling analysis of the electromagnetic railgun system according to claim 1, wherein a specific process of analyzing the coupling action and the distribution characteristics of the electromagnetic field in the launching process of the electromagnetic railgun, directly affecting a distribution of the temperature field, comprises: dividing a heat sources in a launching process of the electromagnetic railgun into three parts, which are (i) a Joule heat generated by self-resistance between the armature and the rails, (ii) a heat generated by a contact resistance on a contact surface between the armature and the rails, and (iii) a heat generated by the friction between the armature and the rails, constructing, respectively, calculation expressions of the three parts, simulating a temperature field of the electromagnetic launching device under electromagnetic coupling by considering a superposition action of the three parts of the heat in the launching process, and determining time-varying characteristics of temperature of the armature, changes of temperature under different peak values of the input pulse current, and changes of temperature under different waveforms of the input pulse current.

4. The method for modeling-simulation and multi-field coupling analysis of the electromagnetic railgun system according to claim 1, wherein the positions where the electrical contact arcing to be generated on the electromagnetic railgun may comprises: a contact position between the armature and the rails where the current density may be concentrated to cause a local Joule heat and a heat accumulation:
- an area with high magnetic induction intensity being concentrated in the groove of the armature and around the contact points between the rails and a tail of the armature, as well as inner surfaces of two the rails; and
- an area with high temperature distribution intensity being concentrated in the groove of the armature and around the contact points between the rails and the tail of the armature.

5. An electronic device, comprising a memory and a processor, and computer-readable instructions stored on the memory and running on the processor, when the computer-readable instructions are executed by the processor, causing the processor to perform the steps of the method according to claim 1.

* * * * *